United States Patent
Dülk et al.

(10) Patent No.: US 10,809,460 B2
(45) Date of Patent: Oct. 20, 2020

(54) DEPOLARIZERS

(71) Applicant: EXALOS AG, Schlieren (CH)

(72) Inventors: Marcus Dülk, Schlieren (CH); Philipp Vorreau, Schlieren (CH)

(73) Assignee: EXALOS AG, Schlieren (CH)

( * ) Notice: Subject to any disclaimer, the term of this patent is extended or adjusted under 35 U.S.C. 154(b) by 160 days.

(21) Appl. No.: 16/123,172

(22) Filed: Sep. 6, 2018

(65) Prior Publication Data

US 2019/0079308 A1    Mar. 14, 2019

(30) Foreign Application Priority Data

Sep. 8, 2017  (GB) .................................. 1714525.1

(51) Int. Cl.
| | |
|---|---|
| G02B 27/28 | (2006.01) |
| G02B 6/27 | (2006.01) |
| G02F 1/01 | (2006.01) |
| F21V 8/00 | (2006.01) |
| G02B 6/122 | (2006.01) |

(Continued)

(52) U.S. Cl.
CPC ......... *G02B 6/2786* (2013.01); *G02B 6/0006* (2013.01); *G02B 6/122* (2013.01);
(Continued)

(58) Field of Classification Search
CPC .... G02B 27/283; G02B 6/272; G02B 6/2786; G02B 6/0006; G02B 6/122;
(Continued)

(56) References Cited

U.S. PATENT DOCUMENTS

| | | |
|---|---|---|
| 4,218,652 A | 8/1980 | Panov |
| 5,911,016 A | 6/1999 | Fujitsu |

(Continued)

FOREIGN PATENT DOCUMENTS

| | | |
|---|---|---|
| CN | 201610548916.X | 12/2016 |
| GB | 2394375 A | 4/2004 |

OTHER PUBLICATIONS

Ortega-Quijana et al., Generation of a coherent light beam with precise and dynamic control of the state and degree of polarization, Optics Letters, (Aug. 1, 2017) v42, n15, p. 2898-2901.

(Continued)

*Primary Examiner* — Kristina M Deherrera
(74) *Attorney, Agent, or Firm* — Law Office of Michael Antone; Michael Antone

(57) ABSTRACT

A depolarizer for a broadband optical source to split the source beam by power, not by polarization state, and route the components into respective light paths. A polarization rotator arranged in one of the light paths rotates the polarization state of that beam component to make it orthogonal to that of the other. The components are then recombined by a combiner and output. A variable optical attenuator is arranged in one of the light paths, which during operation is adjusted by a controller to maintain power equalization between the light paths and hence depolarization performance. The controller receives power measurements from the light paths and from after the combiner via respective sensors. With this feedforward design reminiscent of a Mach-Zehnder interferometer the light from a light source which generates highly polarized light can be depolarized in theory with zero insertion loss and in practice with losses of about 1 dB.

25 Claims, 12 Drawing Sheets

(51) Int. Cl.
*G02B 27/10* (2006.01)
*G02B 6/126* (2006.01)
*G02B 6/28* (2006.01)
*G02B 6/26* (2006.01)
*G02B 6/42* (2006.01)

(52) U.S. Cl.
CPC ....... *G02B 27/1006* (2013.01); *G02B 27/283* (2013.01); *G02F 1/0136* (2013.01); *G02B 6/126* (2013.01); *G02B 6/266* (2013.01); *G02B 6/2706* (2013.01); *G02B 6/2793* (2013.01); *G02B 6/2843* (2013.01); *G02B 6/4213* (2013.01); *G02F 2001/0139* (2013.01)

(58) Field of Classification Search
CPC .. G02B 27/1006; G02B 6/126; G02B 6/2706; G02B 6/2843; G02B 6/266; G02B 6/2793; G02B 6/4213; G02B 6/274; G02F 1/0136; G02F 2001/0139
USPC .......................................... 359/489.08; 385/11
See application file for complete search history.

(56) References Cited

U.S. PATENT DOCUMENTS

| | | | |
|---|---|---|---|
| 6,118,566 A | 9/2000 | Price | |
| 6,522,796 B1 | 2/2003 | Ziari et al. | |
| 6,735,350 B1 | 5/2004 | Gauthier | |
| 6,760,495 B2 | 7/2004 | Gonthier et al. | |
| 6,819,810 B1 | 11/2004 | Li et al. | |
| 6,831,778 B2 | 12/2004 | Yang et al. | |
| 6,850,712 B1 | 2/2005 | Delavaux et al. | |
| 6,975,454 B1 | 12/2005 | Yan et al. | |
| 7,050,222 B2 | 5/2006 | Yu et al. | |
| 7,602,500 B2 * | 10/2009 | Izatt | A61B 3/102 356/497 |
| 8,164,831 B2 | 4/2012 | Yao et al. | |
| 9,069,135 B2 | 6/2015 | Xiong et al. | |
| 9,323,069 B2 | 4/2016 | Janssen | |
| 2002/0181075 A1 | 12/2002 | Fidric et al. | |
| 2002/0191290 A1 | 12/2002 | Chang et al. | |
| 2003/0086174 A1 | 5/2003 | Wakisaka et al. | |
| 2007/0086017 A1 | 4/2007 | Buckland et al. | |
| 2014/0010530 A1 | 1/2014 | Goebuchi | |
| 2015/0311668 A1 | 10/2015 | Mcclean et al. | |
| 2016/0134360 A1 | 5/2016 | Tokura et al. | |
| 2018/0245976 A1 | 8/2018 | Ke et al. | |

OTHER PUBLICATIONS

Heismann & Smith "High-speed polarization scrambler with adjustable chirp", Journal of Selected Topics in Quantum Electronics, vol. 2, No. 2, Jun. 1996, pp. 311-318.

\* cited by examiner

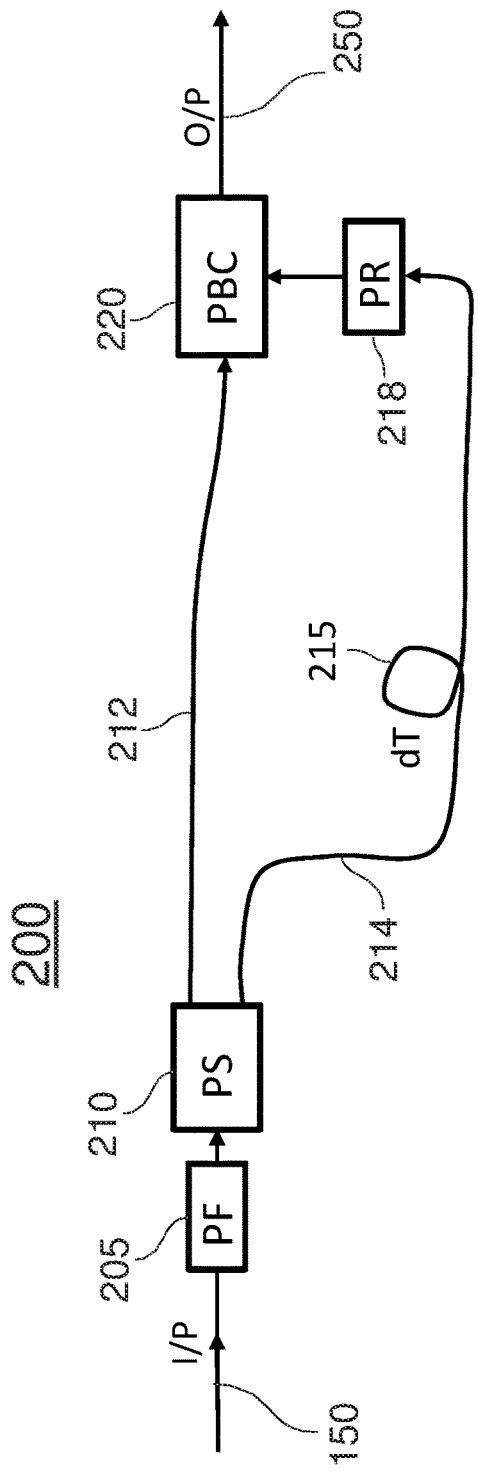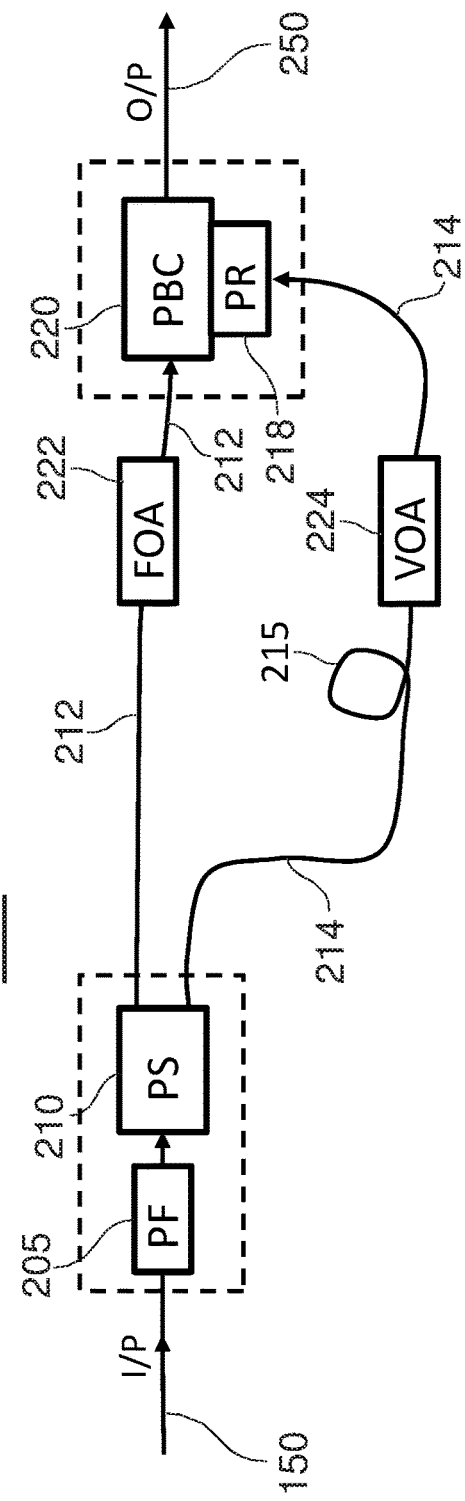

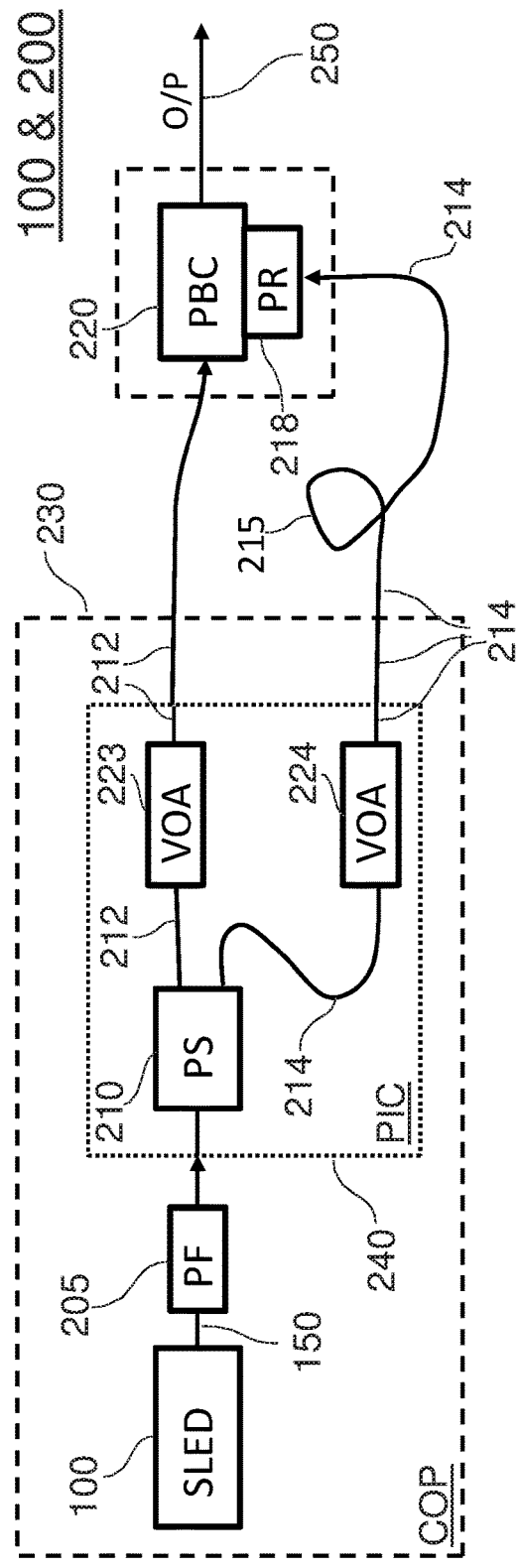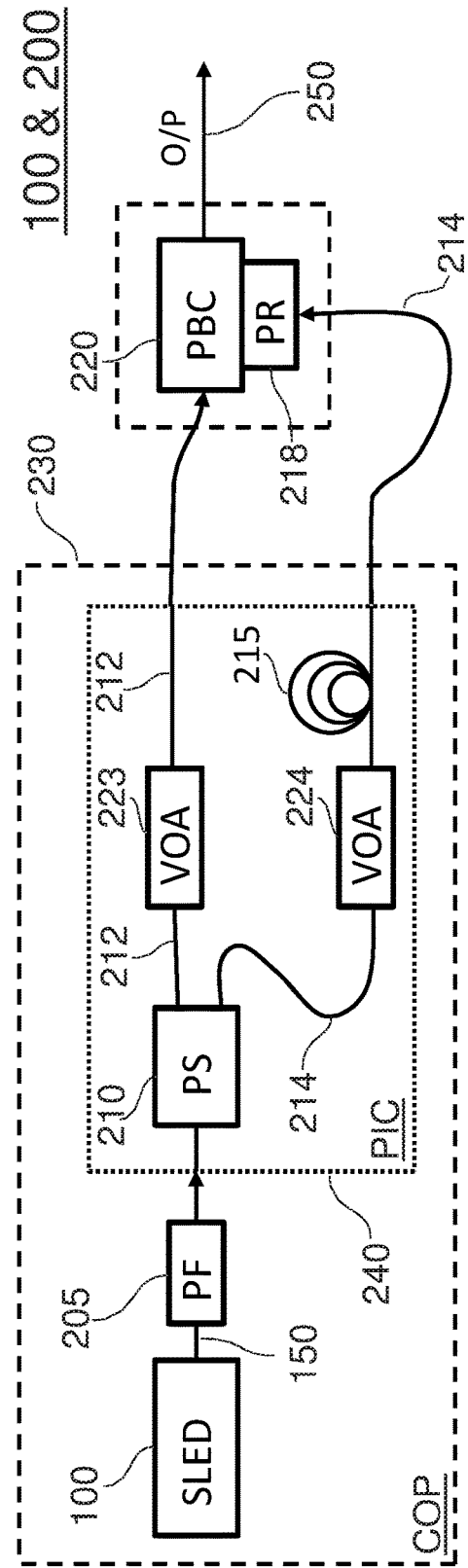

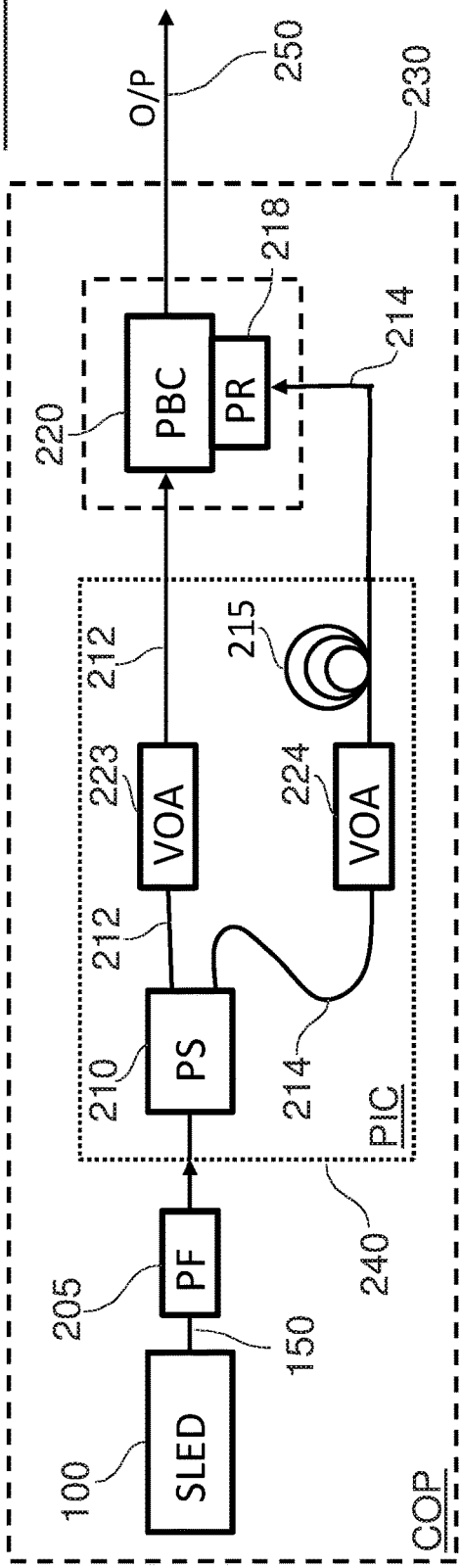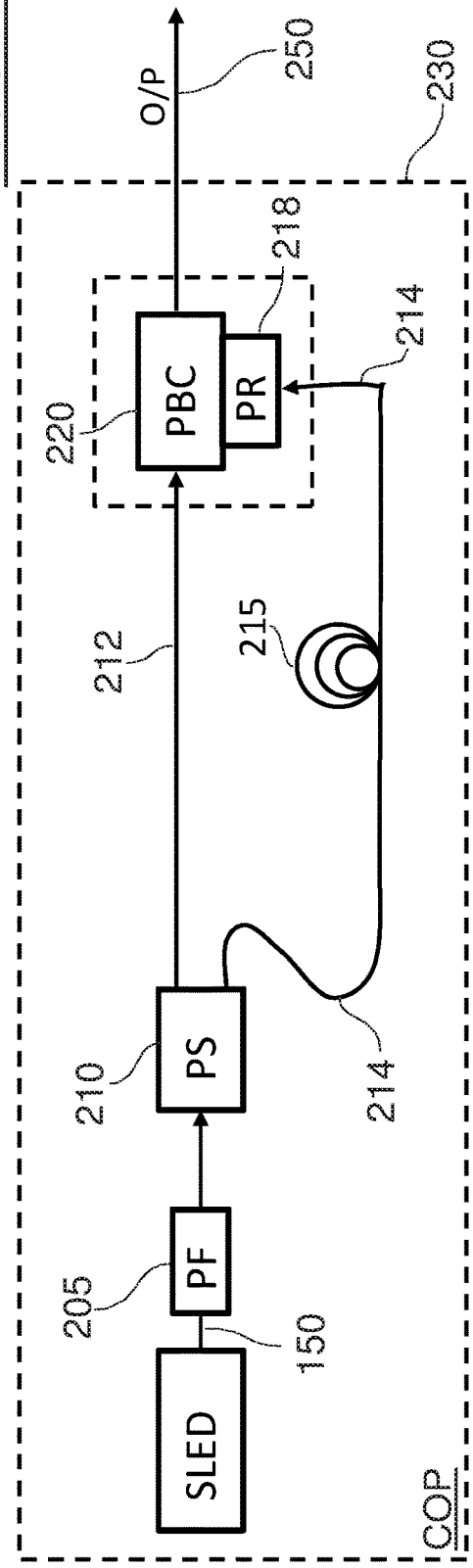

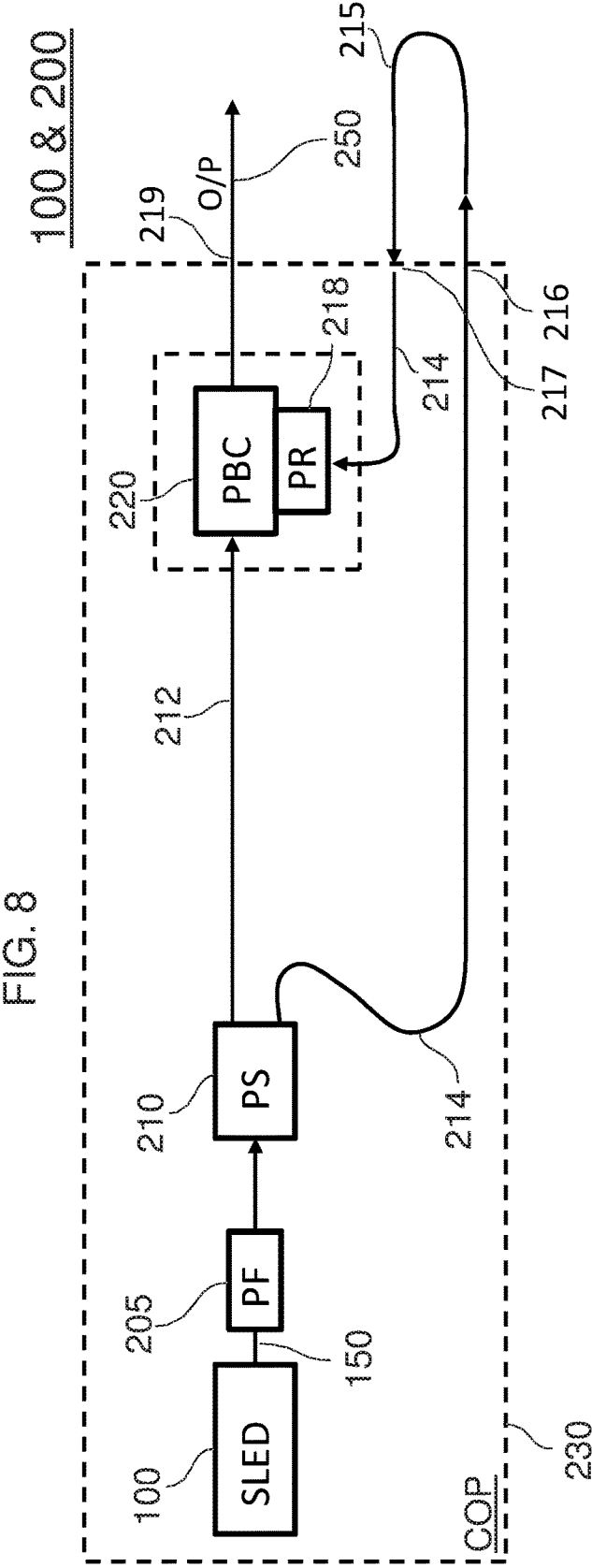
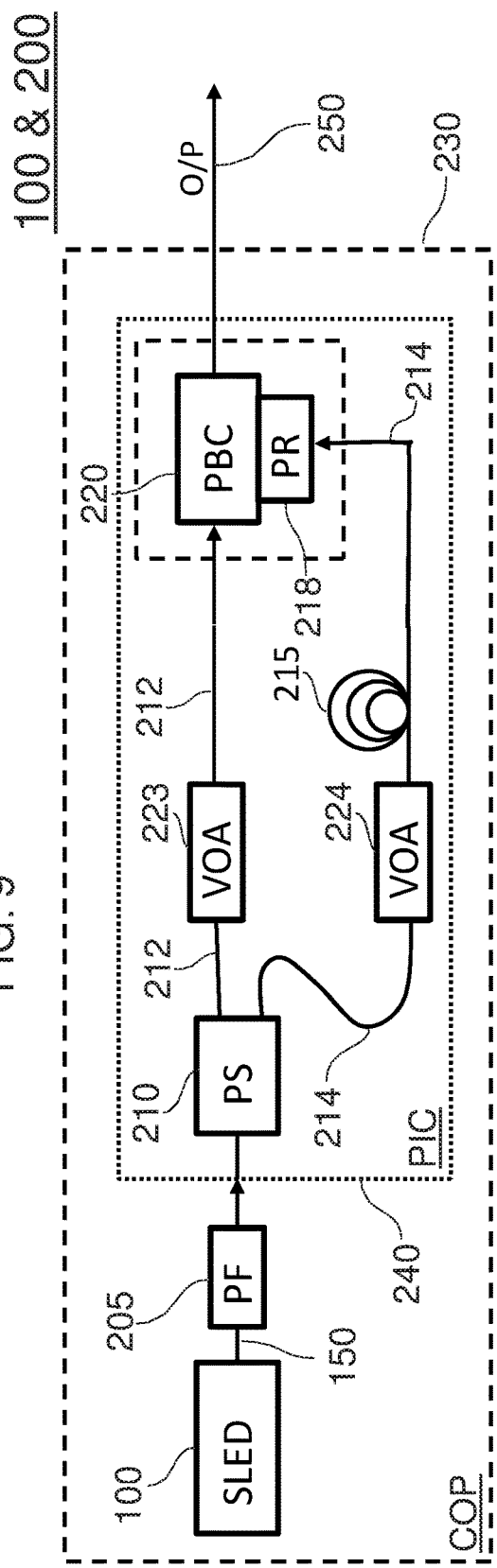

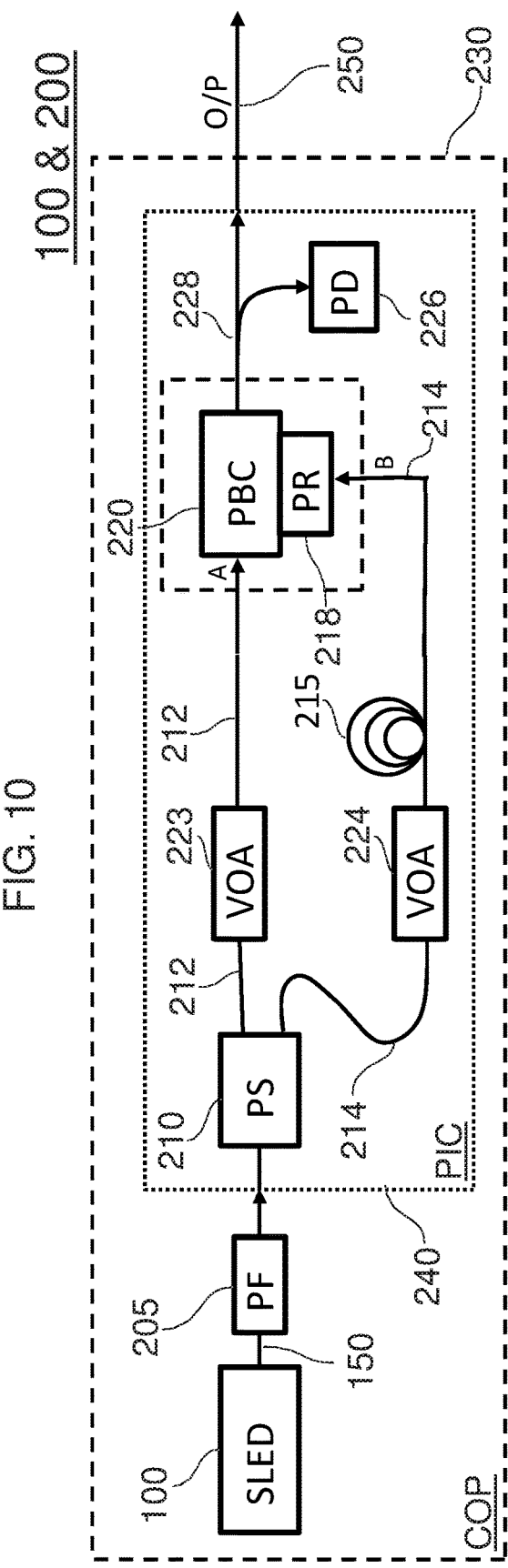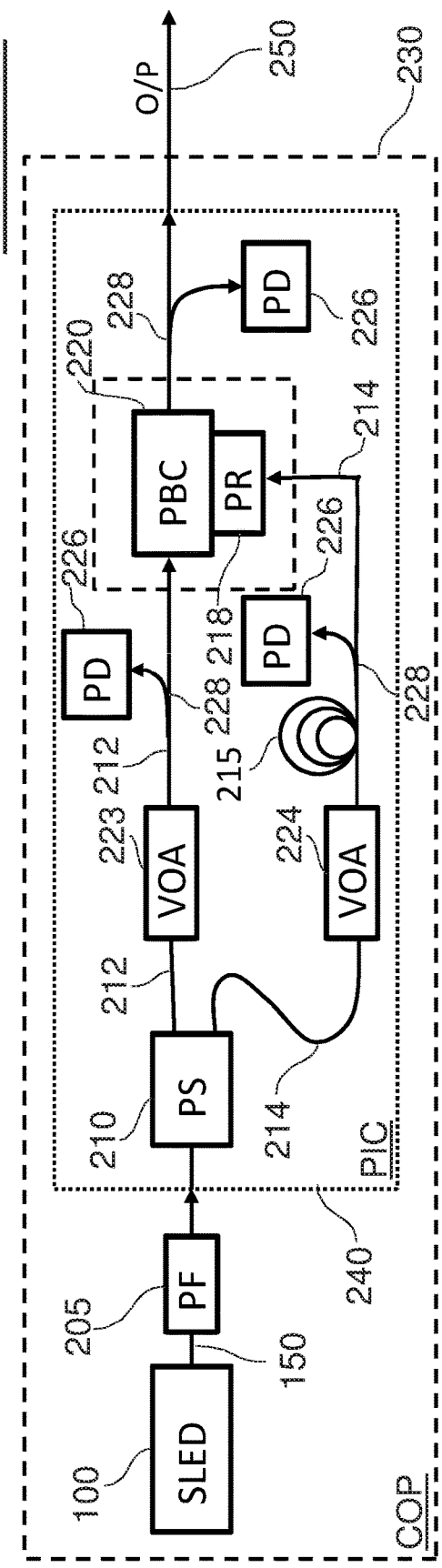

DEPOLARIZERS

CROSS-REFERENCE TO RELATED APPLICATIONS

This non-provisional patent application claims the benefit of and priority to U.K. Patent Application No. 1714525.1, filed Sep. 8, 2017, which is incorporated herein by reference in its entirety.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

FIELD OF THE INVENTION

The invention relates to a depolarizer for generating a depolarized output from a polarized input received from a light source, more especially but not exclusively when the light source is a broadband light source.

BACKGROUND

Certain applications, such as optical component testing, fiber optic gyroscopes (FOGs), fiber optic current sensors (FOCS), fiber Bragg grating (FBG) interrogation and certain medical applications, require broadband input light that is substantially free of polarization, i.e. has a low degree of polarization (DOP). An example medical application is when a catheter or endoscope has an embedded optical fiber. In particular, some medical devices spin the optical fiber to scan a certain area of interest, for example catheters used for artery diagnostics spin the fiber to obtain a 360° view of an artery or vessel of interest. The problem here is that spinning the fiber causes birefringence, which may result in various problems if the (broadband) light source is not depolarized. Consequently, either the broadband source itself must produce unpolarized light or the polarized light from the broadband source must supplied to the downstream optical component through a depolarizer.

Broadband superluminescent diodes (SLEDs) are one example class of light source which have an output which is highly polarized, especially in the case of high output powers. These may be single SLEDs or multiple SLEDs combined in a single module to produce a broader band source, e.g. with a wavelength range of 1250-1650 nm. There is therefore a need to combine broadband SLEDs with depolarizers that convert high DOP (e.g., >80%) light into low DOP (e.g., <2%) light.

All-fiber Lyot-type depolarizers are widely used depolarizers for fiber-coupled light sources, e.g., semiconductor laser diodes. In a Lyot-type depolarizers, two sections of polarization-maintaining (PM) fiber with a certain length are spliced together under a certain angular rotation, e.g., 45 degrees, in order to launch first and second components of the light simultaneously into the fast and slow axes of the PM fibers and thereby introduce an optical path delay (OPD) that is larger than the coherence length of the light source. The two light components thus lose their phase relationship and can then be recombined in an additive manner. Provided that both components have equal power, then the recombined light will be depolarized. A vendor of an all-fiber Lyot-type depolarizer is Phoenix Photonics Limited of Birchington, United Kingdom. Another vendor is Newport Corporation, Irvine, Calif., USA with their model range "F-DEP" marketed under the trademark "PolaZero".

While all-fiber Lyot depolarizers of this kind work well for narrowband light sources such as lasers they have some limitations for broadband light sources, such as SLEDs, where the DOP performance is not spectrally flat, but shows spectral modulations with some wavelength regions having high DOP values and others in between lower DOP values.

A depolarizer design that is able to be combined with a polarized broadband light source such as an SLED to achieve low DOP performance over a wide spectral range is therefore desired.

Several prior art disclosures are now summarized.

U.S. Pat. No. 6,760,495 B2 (Gonthier et al) discloses a depolarizer with a loopback architecture based on a 50:50 splitter where one optical output is looped back, while rotating the polarization, and mixed with the input light. This architecture intrinsically has a minimum insertion loss of 50%.

U.S. Pat. No. 6,735,350 B1 (Gauthier) discloses a depolarizer similar to that of U.S. Pat. No. 6,760,495 B2.

US 2002/0181075 A1 (JDS Uniphase) discloses a depolarizer for depolarizing the output from a laser source with short coherence length of less than a meter. The source output is first linearly polarized by passing it through a polarization maintaining fiber, which serves as an input to a fiber-implemented Mach-Zehnder interferometer (MZI) arrangement. The input splitter splits the source light approximately equally by power, i.e. is a 50:50 splitter. The fibers in each arm of the MZI are in each case two spliced portions of polarization maintaining fiber. In one arm the fast and fast axes are aligned at the splice, and in the other arm the fast and slow axes are aligned at the splice to rotate the polarization by 90 degrees. An optical path difference is provided between the two arms by making the fiber in one arm longer than the other so that the longer arm has a length greater than the coherence length of the source light so as to prevent any interference between the beams when they recombine.

US 2007/0086017 A1 (Bioptigen) discloses a depolarizer designed to receive approximately polarized light, the depolarizer comprising: a) a device for splitting an incident light source into two arms, b) a path length difference greater than the coherence length of the light source with respect to the detection bandwidth (optical or electrical), c) a polarization controller in one of the arms (or one in both arms) to orient the polarizations at the output of the two arms such that the two resultant light fields are substantially orthogonal to each other, and d) a variable optical attenuators (VOA) in one of the arms (or a VOA in both arms). The VOA is used to ensure that the power output of each arm is equal. The optical path difference between the first and second arms should be longer than the coherence length of the light observed by any individual detector located after the depolarizer, in order to ensure that the light coming from each arm is incoherent with respect to the other arm.

U.S. Pat. No. 6,850,712 B1 (Lucent) provides a polarization multiplexing scheme which aims to reduce stimulated Brouilloun scattering (SBS) within an optical fiber narrow-width signal. The input signal is split into two orthogonal polarizations states. A time delay and a frequency shift is introduced to form a polarization multiplexed signal with increased linewidth. Thus, the level of SBS in each polarization is reduced.

U.S. Pat. No. 5,911,016 A (Fujitsu) describes a polarization scrambler used for reducing polarization mode dispersion (PMD). The PMD is mainly due to a phase delay between input polarization states. To solve this problem, the polarization of light is rapidly varied using a polarization controller (by modulation voltage applied to both arms) so that the average polarization over time is effectively randomized:

Heismann & Smith "High-speed polarization scrambler with adjustable chirp", Journal of Selected Topics in Quantum Electronics, vol. 2, no. 2, June 1996, pages 311-318, discloses a design similar to that of U.S. Pat. No. 5,911,016A (Fujitsu) in that it uses the same principle of voltage modulation for scrambling the light polarization.

GB2394375A (Bookham) discloses a device in which a polarization rotator is arranged in one arm of a MZI to convert the TE mode to a TM mode. The second arm contains a phase shifter that ensures interference between the signals of each arm when they are recombined. This device solves the problem of polarization dependence in integrated optical monitoring systems, whereby the waveguide birefringence causes a refractive index difference between the TE and TM modes leads to a wavelength response shift in the TE and TM modes.

U.S. Pat. No. 6,118,566 (Corvis) discloses a 4-channel wavelength division multiplexer (WDM) transmitter which, for its output stage, has a MZI to impress the 4-channels of electrical signal onto a carrier output by a laser source. The electrical signal is impressed on the optical carrier by two up-converters arranged in the two MZI arms. A polarizing element is incorporated into the combiner to introduce differences in the polarization states between the channels.

BRIEF SUMMARY OF THE INVENTION

According to one aspect of the invention there is provided a depolarizer device comprising:

an input for receiving an optical signal from an optical source;

a power splitter configured to split the optical signal into at least first and second optical signal portions of substantially the same polarization state;

at least first and second arms which are light paths connected respectively to receive the at least first and second optical signal portions from the power splitter;

a polarization rotator arranged in the first arm and operable to rotate the polarization state of the first optical signal portion to be orthogonal to that of the second optical signal portion;

a beam combiner arranged to receive and recombine at least the first optical signal portion after rotation by the polarization rotator and the second optical signal portion to form an output optical signal, and an output operable to output the output optical signal.

A depolarizer of this kind is able to achieve low DOP performance over a wide spectral range. In the proposed design, the power splitter splits the optical signal without regard to the input polarization, so is fundamentally different from designs which use a polarizing beam splitter at the input to separate out the two polarization states of an essentially depolarized input beam into two arms. Moreover, in comparison to existing designs based on a feedback loop, the proposed design provides for lower insertion losses and therefore higher output power. For example, the loopback architectures of U.S. Pat. No. 6,760,495 B2 by Gonthier et al or of U.S. Pat. No. 6,735,350 B1 by Gauthier are based on a 50:50 splitter where one optical output is looped back, while rotating the polarization, and mixed with the input light. These prior art architectures intrinsically have a minimum insertion loss of 50%. By contrast, with our feedforward design in which two parallel beams propagate in a forward direction, reminiscent of a Mach-Zehnder interferometer (MZI) structure, and in which the light source generates light with a high PER, the minimum insertion loss is in theory zero, and in practice can be limited to around 1 dB.

The above-mentioned depolarizer device may also further comprise a polarization filter arranged between the input and the power splitter, so that the optical signal is filtered into a linear polarization state prior to being received by the power splitter.

In certain embodiments of the above-mentioned depolarizer device, the first and second arms may be configured to have approximately equal attenuation across a specified wavelength range. In the above-mentioned depolarizer device, the first and second arms may be configured to be substantially transparent across a specified wavelength range.

In certain embodiments of the above-mentioned depolarizer device, the first and second arms, and if present any further arms, may provide spatially separated light paths for the respective optical signal portions. This is to avoid polarization mixing and cross-coupling between the arms.

The first and second arms, and any further arms if present, may be implemented wholly or partly in one or more sections of planar waveguides and/or optical fibers, which may be polarization maintaining.

One or more optical attenuators may be respectively arranged in the arms. One or more of the optical attenuators may be a variable optical attenuator (VOA) that is able to be adjusted. Alternatively, fixed optical attenuators (FOAs) could be provided. A VOA may have a control input through which it can be adjusted during operation of the device. A VOA may be voltage-driven or current-driven. One example embodiment would be to have a FOA in one arm and a VOA in each other arm. Another example would be to have VOAs in every arm. Yet another example would be to have no attenuator in one arm and a VOA in each of the other arms.

For embodiments of the above-mentioned depolarizer device which include at least one VOA, the device may further comprise: one or more sensors configured and arranged to measure respective optical characteristics of at least one of the first optical signal portion, the second optical signal portion and the recombined optical signal, and to generate sensor signal(s) therefrom; and a controller arranged to receive the sensor signal(s) and configured to determine a control signal based on the sensor signal(s) and to apply the control signal to the control input of the optical attenuator so as to equalize power of the first and second optical signal portions.

In some embodiments the depolarizer has more than two arms. Namely, the above-mentioned definition of a depolarizer device in which we only referred specifically to first and second arms may for example be augmented with the following additional elements and features:

the power splitter is configured to split the optical signal into at least third and fourth optical signal portions in addition to the first and the second optical signal portions, wherein the first to fourth optical signal portions are of substantially the same polarization state;

at least third and fourth arms, in addition to the first and second arms, the third and fourth arms being light paths connected respectively to receive the at least third and fourth optical signal portions from the power splitter;

at least second and third polarization rotators in the second and third arms and operable to rotate the polarization state of the first and second optical signal portions to be orthogonal to those of the second and fourth optical signal portions respectively; and the beam combiner is additionally arranged to receive and recombine at least the third and fourth optical signal portions to form an output optical signal.

An alternative definition of a depolarizer device of this kind is one comprising the following elements:

an input for receiving an optical signal from an optical source;

a power splitter configured to split the optical signal into at least first to fourth optical signal portions of substantially the same polarization state;

at least first to fourth arms which are light paths connected respectively to receive the at least first to fourth optical signal portions from the power splitter;

polarization rotators arranged in at least the first, second and third arms and operable to rotate the polarization state of the first and second optical signal portions to be orthogonal to those of the second and fourth optical signal portions respectively;

a beam combiner arranged to receive and recombine the first to fourth optical signal portions, where applicable after rotation by the polarization rotators, to form an output optical signal, and an output operable to output the output optical signal.

Another aspect of the invention provides an optical system comprising the proposed depolarizer device in combination with a light source. The light source is operable to output an optical signal and the depolarizer device is arranged to receive at its input the optical signal output from the light source.

In certain embodiments, the first arm and the second arm of the depolarizer device are configured to have an optical path difference at least one of: 50, 100, 200, 300, 400, 500, 600, 700, 800, 900, 1000, 1500 or 2000 times greater than the coherence length of the light source.

In certain embodiments, the light source is configured so that the output optical signal is linearly polarized with a polarization extinction ratio of at least one of: 5, 10, 15, 20 and 25 dB.

In certain embodiments, the light source has a broadband output optical signal in which the ratio of bandwidth, as defined by full width half maximum, to center wavelength $\Delta\lambda/\lambda$ is greater than $10^{-3}$ times one of: 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 30, 40, 50 and 100.

A further aspect of this invention covers the realization of such a depolarizer using a photonic integrated circuit (PIC) to accommodate some or all of its optical components, in order to significantly reduce the depolarizer's size.

A still further aspect of this invention includes realizing not only the depolarizer but also associated system components, in particular a light source operable to supply light to the depolarizer and/or a downstream optical component that requires depolarized light from the depolarizer, in a single PIC.

Some or all of the depolarizer's optical components as well as optionally also the light source and/or downstream optical component can be accommodated in a common optical package (COP).

As well as being of interest for broadband SLEDs as mentioned in the introduction, the proposed depolarizer is more generally of interest to other broadband high DOP light sources and indeed also narrowband high DOP light sources. For example, the proposed depolarizer may be used in conjunction with broadband wavelength-tunable light sources and swept sources including both wavelength-tunable lasers and wavelength-tunable light sources based on bandpass-filtered amplified spontaneous emission (ASE). Depending on the tunable sources, at any given time, the bandwidth of the output may be anything from narrow to broad. A narrowband output (e.g. tens of kHz in the UV to IR range) may arise for a single-frequency external cavity lasers laser. A broader linewidth (e.g. tens of MHz in the UV to IR range) may arise for a single-frequency DFB (Distributed FeedBack), DBR (Distributed Bragg Reflector), SG-DBR (Sample Grating DBR) or similar lasers and also VCSELs (Vertical Cavity Surface Emitting Lasers) and similar lasers. A still broader linewidth (e.g. tens of GHz in the UV to IR range) may arise for multi-frequency external cavity lasers or wavelength-tunable ASE sources or when rapidly tuning or sweeping across a broad spectrum (e.g., 5 nm, 10 nm, 25 nm, 50 nm, 75 nm 100 nm, 150 nm or even more) at fast repetition rates, for example at rates of 0.5-200 kHz or higher. Other sources which may be used with the proposed depolarizer are a combination of multiple ones of any of the above sources whose outputs are combined in some way, e.g. spectrally combined.

A further aspect of the invention provides an optical system comprising the proposed depolarizer device in combination with a downstream optical component. The downstream optical component has a particular bandwidth and associated coherence length. The downstream optical component is arranged to receive the optical signal output from the depolarizer device. The system may additionally include a light source of the above-mentioned kind which is arranged to supply a light beam to the input of the depolarizer.

In certain embodiments, the first arm and the second arm of the depolarizer device are configured to have an optical path difference which is at least one of: 1.5, 2, 3, 4, 5, 6, 7, 8, 9, 10, 20, 30, 40, 50, 60, 70, 80, 90 or 100 times greater than the coherence length of the downstream optical component.

In certain embodiments, the light source has a broadband output optical signal and the downstream optical component has a narrowband response, the ratio of their coherence lengths being greater than one of: 5, 10, 15, 20, 30, 40, 50, 100, 200, 300, 400, 500, 600, 700, 800, 900, 1000, 1500 and 2000.

The downstream optical component may include at least one of the following optical elements: a fiber Bragg grating, FBG; an arrayed waveguide grating, AWG; a wavelength-division multiplexer; WDM, filter; a phase modulator; (fiber) coupler; an optical fiber forming part of a catheter; laparoscope; endoscope or bronchoscope; an optical fiber contained in a light-guiding tube; a spectral add/drop filter; an optical fiber loop sensor; a Fabry-Perot filter; a dielectric edge filter; a bandpass filter; a bandgap filter; and any optical filter realized with integrated photonics (i.e. solid-state waveguide devices), especially since solid-state waveguide devices are often significantly birefringent.

The components of the above-mentioned systems may be arranged in any desired combination of COP and PIC, including the possibility of a COP with more than one PIC, e.g. two or three. For example, we envisage embodiments with at least two of the light source, the depolarizer and the downstream optical component arranged in a single photonic integrated circuit, and embodiments with at least two of the light source, the depolarizer and the downstream optical component arranged in a common optical package. It is also the case that in certain embodiments the three principle sub-assemblies represented by the downstream optical component, the light source and the depolarizer device have some but not all of their individual elements on a particular PIC or in a particular COP. For example, delay lines may be external to the COP.

BRIEF DESCRIPTION OF THE DRAWINGS

This invention will now be further described, by way of example only, with reference to the accompanying drawings.

FIG. 2B shows a variant of the design of FIG. 2A with a polarizer being added on the input side of the depolarizer.

FIG. 3 shows a further design variant incorporating fixed and variable optical attenuators in respective arms of the depolarizer.

FIG. 6A shows an embodiment combining a source and a depolarizer in which a common optical package is provided, and some of the optical components of the depolarizer are integrated in a photonic integrated circuit.

FIG. 6B shows a variant of FIG. 6A with a further optical component, namely a delay line, integrated in the photonic integrated circuit.

FIG. 6C shows a variant of FIG. 6B with all of the depolarizer's optical components being housed in the common optical package together with the source.

FIG. 7 shows another embodiment without a photonic integrated circuit, but with the source and depolarizer both being accommodated in a common optical package.

FIG. 8 shows a variant of FIG. 7 in which a fiber delay line is arranged outside the common optical package.

FIG. 9 shows a variant of FIG. 6C with more optical components integrated in the photonic integrated circuit.

FIG. 10 shows a variant of FIG. 9 with a photodiode provided to measure output power from the depolarizer.

FIG. 11 shows a variant of FIG. 10 with two further photodiodes provided to measure power in respective arms of the depolarizer.

DETAILED DESCRIPTION OF THE PREFERRED EMBODIMENTS

Figure 1:
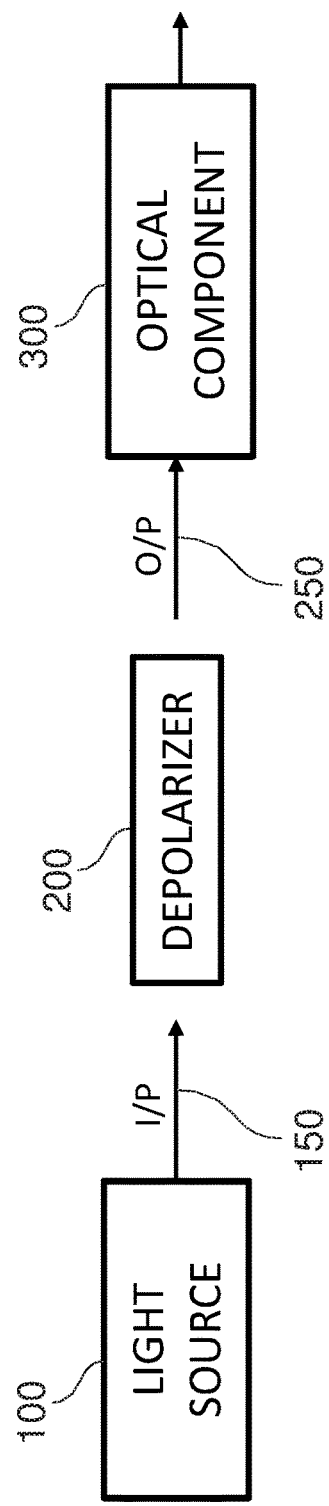
FIG. 1 is a schematic drawing of a source, depolarizer and downstream optical component according to an optical system embodying the invention.

Before describing various embodiments, we first describe the meaning of some terms used in this document.

Optical component: The term optical component is used generically to include all components relevant for the optical design and performance of a device or system, including for example optoelectronic components (e.g. a photodiode or a variable optical attenuator) and optomechanical components (e.g. coupler positioners) and not just purely optical components (e.g. a micro-optic lens or a section of optical fiber). An optical component may include a single optical element or a plurality of optical elements.

Common optical package (COP): COP is a term used to describe physical packaging available to house one or more optical components as well as optionally also electronic components. A COP is characterized by a housing containing the components to be packaged and externally connectable electrical pins and/or optical outputs, such as for connecting optical fibers. The COP may also include other services, such as for temperature control. For example, a Peltier device may be part of, or arranged in, the COP which can provide heating and cooling to maintain the interior of the COP at a desired temperature. The heating controller, such as a PID (Proportional-Integral-Derivative) controller, may be integrated in the COP or external. Example COPs which are currently popular include a butterfly (BTF) package, for example a 14-pin BTF package, or a dual-in-line (DIL) package, for example a 6- or 8-pin mini-DIL package, a High Heat Load (HHL) package and a Transmitter/Receiver Optical Subassembly (TOSA/ROSA) package.

Photonic integrated circuit (PIC): PIC is a term used in analogy to an electronic semiconductor integrated circuit to describe integration of multiple optical or optoelectronic components onto a single chip or substrate, and sometimes other components including electronic components, onto a single wafer or substrate based around planar waveguides. The wafer or substrate of a PIC may, for example, be based around crystalline lithium niobate materials system (LiNbO3), the crystalline lithium tantalate system (LiTaO3); crystalline semiconductor (crystal) heterostructure materials system, such as in the gallium arsenide (GaAs) and indium phosphide (InP) materials system, GaAlInAsP, such as GaInAs/InP or GaAs/AlGaAs etc., or silicon materials system, Si or SiGe; the silicate glass system using silica and many other compounds which may be mixed with silica including boron, phosphor, aluminum etc; and the silicon nitride materials system (Si3N4). PICs are sometimes alternatively referred to as planar lightwave circuits (PLC) or integrated optoelectronic devices.

Coherence length: Coherence length is a measure of temporal coherence, expressed as the propagation distance over which the coherence of an electromagnetic wave, in our context light, significantly decays. Coherence length l of a broadband light source can be calculated by the equation:

$$l = \gamma \cdot \frac{2\ln 2}{\pi} \cdot \frac{\lambda^2}{\Delta\lambda}$$

where

λ is the center wavelength,

Δλ is the 3 dB optical bandwidth, and

γ is a factor that accounts for the fact that many broadband SLEDs do not have a Gaussian shape, but rather a flat-top spectrum. A value of γ=1.186 is typically used for a flat-top spectrum.

Coherence length for another component, such as a narrowband filter, can be calculated using the same formula with γ=1 for a filter with a Gaussian response, which gives:

$$l = 0.441 \cdot \frac{\lambda^2}{\Delta\lambda}$$

For example, an optical spectrum with a Gaussian shape and a bandwidth of 20 nm at 800 nm has a coherence length of ~14.1 microns, while a source with the same spectral shape and bandwidth at 1600 nm would have a 4-times longer coherence length of ~56.5 microns. Here it is noted that for an optical component that is not a source, but rather receives light and manipulates it in some way such as through transmission or reflection, it is more normal to talk about the component's bandwidth. Nevertheless, bandwidth is directly related to coherence length through the above formula, so it is also possible to talk about the coherence length of a filter or other optical component that is not a source. In the context of the present invention this is useful, since it is relevant to compare coherence length of the light output by a broadband source with the bandwidth of a downstream optical component which receives that light.

Polarization extinction ratio (PER): PER is often used as a measure of DOP. PER is the ratio of optical powers of perpendicular polarizations, usually called transverse electrical (TE) and transverse magnetic (TM). The DOP value also defines the maximum value of PER that can be measured if the light is linearly polarized:

$$PER = 10 \cdot \log_{10}\left(\frac{1+DOP}{1-DOP}\right)$$

PER is commonly expressed in dB while DOP is usually expressed in percent. For example, a DOP of 90% corresponds to a PER of 12.8 dB.

Broadband optical source: Broadband optical source is a term used to describe sources, such as SLEDs or rare-earth doped fiber amplified spontaneous emission (ASE) sources, which emit over a broad wavelength range (or wide frequency spectrum). "Broadband" is of course inherently a relative term but is generally understood to mean that the bandwidth Δλ is relatively large compared with say the bandwidth of a laser output or the bandwidth of a narrowband filter such as a Bragg grating. In the context of the present invention, one way of defining the term "broadband" for the source is relative to the bandwidth of a "narrowband" downstream optical element which the broadband source and depolarizer are intended to operate with. With such a relative definition, the broadband source and narrowband filter can be jointly defined by the ratio of their coherence lengths (or bandwidths), so that the source is broadband and the filter is narrowband when the ratio of their coherence lengths (or bandwidths) is greater than some multiple such as: 5, 10, 15, 20, 30, 40, 50, 100, 200, 300, 400, 500, 600, 700, 800, 900, 1000, 1500 or 2000 for example. In the context of the present invention, another way of defining the term "broadband" for the source is an absolute terms using a parameter such as source coherence length l, or source bandwidth Δλ, or the ratio of source bandwidth to source center wavelength Δλ/λ. For example, having regard to what is conventionally considered to be a narrowband source—typically a laser—as opposed to a broadband source—such as a light emitting diode based on interband electron-hole recombination from a semiconductor or a rare-earth doped fiber ASE source—then a broadband source in the soft ultra-violet, visible to near infra-red region, e.g. 250 nm to 2 μm, could be defined as a source having a coherence length less than one of: 500, 400, 300, 200, 100, 90, 80, 70, 60, 50, 40, 30, 20, 10, 9, 8, 7, 6, 5, 4, 3, 2 or 1 micrometers, or a source having a bandwidth greater than one of: 1, 2, 3, 4, 5, 6, 7, 8, 9, 10, 11, 12, 13, 14, 15, 16, 17, 18, 19, 20, 30, 40, 50 or 100 nm. A definition based on the ratio Δλ/λ may also be convenient. For example, a source may be defined as being "broadband" when it has a value of Δλ/λ, where bandwidth is defined through the full width half maximum (FWHM), that is greater than one of: 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 30, 40, 50 or 100×10^−3 (i.e. values between 0.0001 to 0.1).

Input DOP (or PER) versus Output DOP (or PER): By definition any depolarizer acts to receive an input light beam with a certain input DOP and to emit an output light beam which has an output DOP less than the input DOP. Since the degree of depolarizing is inherently relative, we provide here some example numbers which are representative of real-world examples and what is achievable with the proposed depolarizer design. Embodiments of the invention envisage having input light with PER values in the range of 6 dB to 25 dB (corresponding to DOP values in the range of ~60% to ≥99%) and an output PER of less than 0.5 dB (DOP ~5%) for some applications, or less than 0.2 dB PER (DOP ~2%) for other applications, or even less than 0.1 dB PER (DOP ~1%) for still further applications, so output PER (DOP) values in the range of 0.5 dB to 0.1 dB (5% to ≤1%). These are representative values and not intended to be restrictive or to exclude embodiments that lie outside these performance values or ranges.

Having now described the meaning of these terms we now describe various embodiments of the invention.

FIG. 1 is a schematic drawing of an optical system comprising a light source 100, depolarizer 200 and an optical component 300 according to a first embodiment.

The light source 100 is operable to output an optical signal which is directed via an optical path 150 to an input I/P of the depolarizer 200 which is operable to depolarize the optical signal and output the depolarized optical signal at its output O/P to an optical path 250. The optical path 250 leads to the optical component 300 which is thus arranged to receive the depolarized optical signal output from the depolarizer.

The principal novel aspects according to embodiments of the invention relate to the design of the depolarizer 200 itself and how the depolarizer design is implemented in relation to the light output by the source 100 and the bandwidth of the downstream optical component 300 it is intended to operate with.

The proposed depolarizer designs are especially beneficial when used in combination with a light source that has a non-smooth output power distribution as a function of wavelength and a varying SOP or a varying DOP as a function of wavelength. In particular, one important kind of light source with these properties is an SLED.

The depolarizer designs are also made in consideration of the downstream optical component whose performance is sensitive to the SOP of the input light. The depolarizer designs can provide low losses when the light received from the source is strongly polarized. In particular, the depolarizer designs can be implemented to cope with downstream optical components with a larger coherence length, i.e. smaller bandwidth, than the light source, such as narrowband optical filters that are birefringent and/or have a large polarization-dependent wavelength response, i.e. polarization-dependent loss (PDL) or polarization-dependent wavelength change (PDλ). Specific examples of such narrowband optical filters are: fiber Bragg grating (FBG) sensors, arrayed waveguide grating (AWG) receivers and add/drop wavelength division multiplexing (WDM) filters, which are used, for example, in telecommunication networks.

Figure 2A:
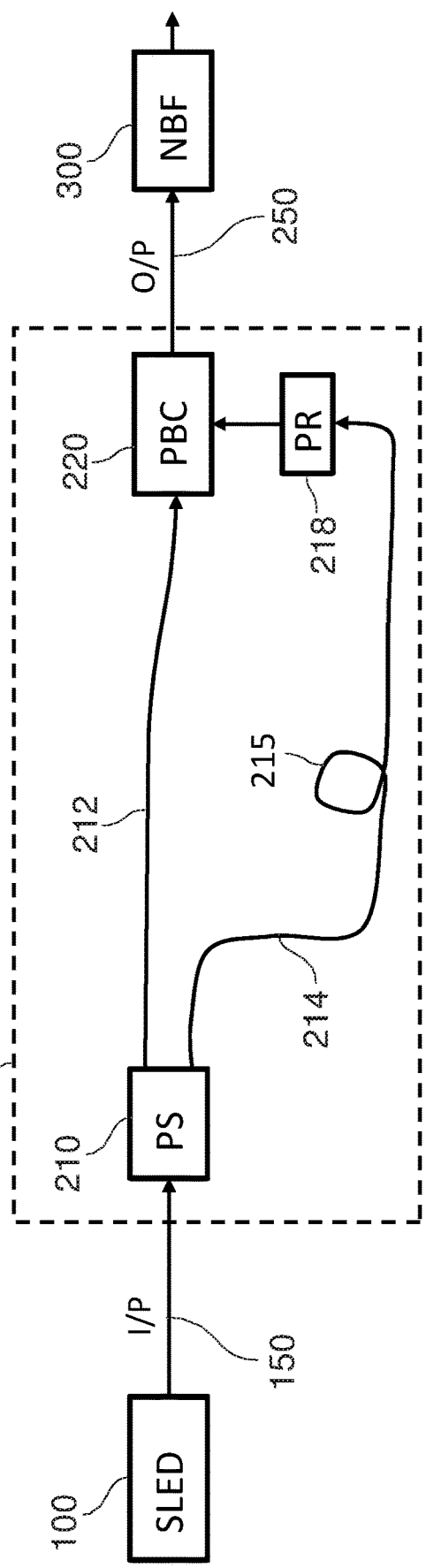
FIG. 2A shows some detail of the depolarizer of FIG. 1 showing its Mach-Zehnder-like structure in which the input light is split into first and second arms and then recombined at the output.

FIG. 2A shows some detail of the depolarizer 200 according to an embodiment of the invention. The depolarizer 200 receives light from the light source 100, which is illustrated as an SLED, via the input 150. It is noted that an SLED typically has a polarized output with a PER of perhaps 5 to 25 dB, with values of perhaps 10-20 dB being perhaps the most usual. The design of the polarizer 200 is therefore optimized for receiving an input that is already quite strongly polarized. For example, the SLED output many have a PER of 20 dB, which is equivalent to a TE/TM power ratio of 100:1. The depolarizer 200 transmits, i.e. outputs, depolarized light at its output 250 to the optical component 300, which is illustrated as being a narrowband filter (NBF).

As already mentioned, the depolarizer 200 has an input for receiving an optical signal from a broadband optical source. This input leads to a power splitter (PS) 210 configured to split the optical signal into first and second optical signal portions of at least approximately equal power and substantially the same, preferably linear, polarization state and substantially the same spectrum (i.e. power distribution as a function of wavelength over the typically broadband emission of the light source 100). The power splitter 210 may, for example, be a 50:50 splitter to provide equal power at each output. (The input signal is thus not split on the basis of polarization, but power, with the two signal portions having the same polarization.) The PER of each signal portion is ideally significantly more than that of the input, for example 5-15 dB higher than the input PER. For example, if the input signal PER is 20 dB, then the PER of the signal portions after the power splitter may be 30 dB. This can be achieved by employing a power splitter that only acts on one polarization state, i.e. the dominant one output from the SLED.

The first and second optical signal portions from the power splitter 210 are received into first and second arms 212, 214 respectively which are light paths for the respective signal portions. The light paths may be free space light paths or waveguides, wherein the waveguides may be optical fiber or solid state. The first and second arms 212, 214 are preferably physically separate such that the two signal portions are optically decorrelated from each other, thus avoiding polarization mixing and cross-coupling between the two arms.

One of the arms, illustrated to be the second arm 214, has a longer optical path length than the other, the extension being illustrated as an optical delay line (dT) 215. The arms 212, 214 are received by a polarization beam combiner (PBC) 220. A polarization beam combiner will give low losses, and is hence preferred in most cases, but other types of beam combiners could be used, such as those that would lose half the signal, i.e. have a 3 dB insertion loss, such as a fused fiber coupler or a free-space beam coupler. Prior to receipt by the polarization beam combiner 220, at least one of the signal portions has its polarization rotated so that the polarization states of the two signal portions are orthogonal to each other. Making the two signal portions orthogonal in their polarizations can be achieved as illustrated by placing a 90 degree polarization rotator (PR) 218 in one of the arms, illustrated as the same arm as the delay line 215, although the rotator 218 and delay line could be in different arms. (A half-wave plate could also act as the 90 degree polarization rotator.) Orthogonal polarizations in the two arms at the input to the beam combiner 220 could also be achieved by arranging a polarization rotator in each arm, if desired, to rotate the polarizations of the two signal portions by amounts that are 90 degrees apart, e.g. 30 degrees and 120 degrees. The beam combiner is advantageously designed to have a high directionality in respect of the input polarization of the light received from the arms 212, 214, so that the residual weak polarization component of the light is strongly rejected. The beam combiner 220 thus outputs a depolarized light beam to the output optical path 250. The power is preferably balanced between the two arms so that the beam combiner receives equal power from each arm 212, 214, which in turn ensures that the output has equal power contributions from the two orthogonal polarizations. By balanced or equal power, we do not just mean total power over the spectrum of the light source output, but preferably that the two linearly polarized light beams in the two arms have the same optical power level as a function of wavelength across the wavelength range of emission of the broadband light source. To achieve this, not only does the power splitter 210 need to split the light source's output in a way that splits the wavelength components consistently, e.g. 50:50 (or by some other ratio such as 60:40), for each wavelength component, but also that the losses across the wavelength range of the light source's output should be the same in both arms. In practice, the easiest way of achieving this is to chose materials for the arms which are highly transparent across the optical wavelength range of the broadband light source and, to the extent the materials are absorbent, that their spectral loss profile is extremely flat, i.e. has substantially the same loss across the optical wavelength range of the broadband light source. For example, for a broadband source in the near-infrared at 1300-1650 nm, a material such as InP should be avoided for the depolarizer arms, since it would not be transparent and would most likely result in waveguide losses that are not spectrally flat, therefore lowering the PER of the light portions input to the depolarizer. Instead, for a 1300-1650 nm source, more-transparent materials such as Si/SiO2 or LiNbO3 would be more suitable.

The balancing of power between the two arms need not necessarily mean equal powers in the two arms along their whole lengths, but rather the aim is to ensure that the beam combiner outputs equal contributions from the two inputs. For example, in the illustrated arrangement with a polarization rotator 218 in one arm and not the other, and supposing the polarization rotator is associated with a certain loss, then the power splitter 210 could be configured to supply more power into the arm 214 than the arm 212 to compensate for losses in the rotator 218. Similarly, the delay line 215 may cause additional losses in the arm 214 which can be compensated for by deviating from a 50:50 ratio in the power splitter 210. Losses in the delay line 215 may occur in the case that the delay line is implemented through a (lossy) optical fiber or solid-state waveguide, for example.

It will be understood that a delay line 215 implemented in optical fiber will be realized by providing an additional length of the fiber, e.g. in a spool, compared with the other arm. The delay line 215 may also be realized using free-space or bulk optics (e.g., a retarder) or integrated optics (i.e. elongated on-chip waveguide paths).

The polarization rotator 218 will not generally need active control during operation, so in many embodiments it will be a fixed component. However, in some embodiments, the polarization rotator can be placed under active control to adjust the amount of rotation, e.g. in response to a measurement of light power or PER in either or both of the arms or the beam combiner output.

The beam combiner 220 has been mentioned above as a polarization beam combiner, such as a polarizing beam splitter (PBS) cube or polarization-dependent fiber coupler. The advantage of a PBS is that an ~3 dB insertion loss is avoided. However, a variety of optical components capable of combining the two orthogonally polarized beams from the two arms could be used. For example, a simple beam combiner, such as a fused optical fiber coupler could be used. Another example would be to use a thin-film polarizer with the light path (i.e. time) reversed compared with use as a polarizer, such as a plate polarizer, e.g. arranged at the Brewster angle, or a polarizing cube, e.g. according to the MacNeille design.

The output of the beam combiner 220 leading to the optical path 250 to the downstream optical component 300, if implemented in optical fiber, may be single mode (SM) fiber or multimode (MM) fiber as desired. In other embodiments, it may be implemented in free-space optics or solid-state waveguides.

In an optical fiber implementation, polarization-maintaining (PM) fiber can be used for the first and second arms 212, 214 and also for any optical fiber linking the light source to the input of the power splitter 210. (PM fiber is fiber that has a strong birefringence so that, if polarized light is input into the PM fiber aligned with one of the birefringent axes, the polarization state will be preserved.) To avoid unnecessary losses, any PM fiber will of course have to be correctly aligned to match its fast axis to the dominant polarization axis of the polarized light being received. The PM fiber will also need to be specified so there is no significant cross-coupling between its fast and slow axes, i.e. to avoid the PER deteriorating during propagation along the PM fiber.

Instead of PM fiber, and to achieve the same effect in the context of the depolarizer, it would also be possible to use single-polarization (SP) fiber, which is fiber that only transmits light that is linearly polarized along the relevant axis of the SP fiber, light of other polarizations either not being guided or suffering from high loss. SP fiber may be realized in photonic crystal fiber, for example.

Regarding the polarization beam combiner it is noted that this component will only accept at its two inputs the respective two orthogonal polarization states that it is designed to combine, so will also act to reject any unwanted polarization components. However, it will be understood that ideally the power splitter, arms, polarization rotator, their couplings and all other design aspects leading up to the polarization beam combiner should be configured to ensure that there is a minimum of such unwanted polarization components received at the polarization beam combiner, since these will only cause insertion losses at the polarization beam combiner.

Optimization of the power balancing at the beam combiner can be achieved at the end of the manufacturing process when testing the device by tuning some part of the device while measuring power, e.g. in the arms close to the beam combiner and/or at the beam combiner output. Possible optical components that could be tuned are: the power splitter 210, if the splitting ratio is tunable; a variable attenuator in either or both arms 212, 214 to reduce power in one arm to match that in the other; and one or more couplers between any two components to vary the efficiency of the coupling, such as between the rotator 218 and the beam combiner 220.

An important parameter for the specification of the depolarizer in the context of the optical system in which it will operate is the magnitude of the OPD, i.e. delay, between the two arms. Conventionally, a depolarizer introduces an OPD of a magnitude specified having regard solely to the coherence length of the light source. By contrast, according to embodiments of the invention, the OPD is specified having regard to the coherence length of the downstream optical component. This is because, with a broadband optical source, the source bandwidth will be large and, if the downstream optical component has a narrow bandwidth, it will be the latter's bandwidth that will determine the minimum OPD required between the depolarizer arms, not the former's. We consider this to be a novel realization and design approach, since conventionally a depolarizer's OPD is specified solely in relation to the source. For lasers, the coherence length can be several tens of centimeters or meters, requiring large OPDs and—typically—long PM fibers such that the birefringence (index difference) of the PM fiber accumulates over the geometrical path length of the fibers to the right amount of OPD. However, for broadband light sources the coherence length is rather short. For example, an amplified spontaneous emission (ASE) source with a Gaussian spectrum of 40 nm FWHM at 1550 nm has a coherence length of 26.5 micrometers. This suggests that an OPD of some multiple of the source coherence length, e.g. 10 times which is ~0.25 mm, should be fully sufficient to depolarize the source. In a sense, this is a valid conclusion. However, for certain applications where narrowband optical filtering of broadband light is performed after the depolarizer, for example FBG interrogation, the OPD of the depolarizer should instead be defined by the bandwidth of the downstream narrowband filter, i.e. its smallest optical resolution of interest. For example, if the narrowband filter has a Gaussian response and a 20 pm bandwidth at 1550 nm, then this will correspond to a filter coherence length of 53.0 mm. The narrowband filter thus has 2000 times the source coherence length, so that specifying the depolarizer conventionally with an OPD set at, for example, 10 times the source coherence length, i.e. 0.25 mm, will be inadequate to cope with the coherence length of the narrowband filter, and poor performance will result. Rather, the OPD of the depolarizer should be specified to be some multiple of the coherence length of the narrowband filter, i.e. some multiple of 53 mm, e.g. 10 times, which would be ~50 cm. Other applications with even smaller bandwidth (i.e. optical resolution) requirements may require still larger OPD values to adequately depolarize the broadband source. Generally, from this example, it is apparent that, for broadband sources, the OPD between the depolarizer arms often needs to be set according to the coherence length of the narrowband downstream optical component, not that of the broadband upstream light source.

Given the long delay requirements for the depolarizer, which are dictated by the narrowband downstream optical element that is to receive the depolarized light and not by the broadband upstream light source, the delay line can be conveniently implemented with optical fiber, in particular PM fiber. It is further noted that, in order to achieve a low DOP at the output of the depolarizer over a wide spectral range of a broadband light source, it is important to avoid polarization mixing and cross-coupling between the two arms. Such mixing and cross-coupling occurs when two linearly polarized light beams travel in a birefringent medium along the same path, e.g., in an all-fiber Lyot-type depolarizer. The two light beams can interfere over a so-called "polarization beat length" that can results in a periodic increase of DOP and in spectral ripple that reduces the performance of the light source (https://www.rp-photonics.com/polarization_beat_length.html). Such undesired effects can be avoided by spatially separating the two linearly polarized light beams after the polarization splitter, either into different waveguides in a PIC or different optical fibers. (Of course, if the two arms are implemented as free-space optical beam paths the issue does not arise, since air is not a birefringent medium.) This means that the lowest DOP after the beam combiner can be achieved with the highest PER of the light beams propagating in the two arms of the depolarizer. That is the light beams propagating in the two arms of the depolarizer should have the highest possible degree of linear polarization to achieve a fully depolarized (i.e. PER=1=0 dB) output from the beam combiner. This inverse relationship between high PER in the depolarizer arms and low DOP at the beam combiner output is considered to be a novel parameter space compared with conventional approaches to depolarizer design.

To ensure reliable performance, the OPD between the depolarizer arms should be specified to be greater than the coherence length of the downstream optical component, usually by some multiple such as 1.5, 2, 3, 4, 5, 6, 7, 8, 9, 10 or more. With optical fiber, large OPDs are easily realizable so higher multiples may be chosen to be on the safe side, whereas with PICs this is more costly, so lower multiples may be chosen. Nevertheless, excessively long delay lines with overly large OPD values should be avoided in solid-state waveguides, since they may introduce polarization mixing and hence reduce the performance of the depolarizer.

FIG. 2B shows a variant of the design of FIG. 2A with the only difference being the addition of a polarizer or polarization filter (PF) 205 on the input side of the power splitter 210. The polarizer 205 is thus arranged between the input of the depolarizer and the power splitter 210, so that the optical signal is filtered into a linear polarization state prior to being received by the power splitter 210. Namely, the polarizer 205 is aligned to filter out the weak polarization state of the input. Providing a polarization filter 205 avoids any polarization mixing occurring in the materials of the arms 212, 214 owing to any birefringence of the arm materials. This may be relevant when the arms are partly or wholly fabricated in a solid medium with non-negligible birefringence, such as in a PIC or PM fiber.

In the case that the input received from the light source is already strongly polarized, e.g. with a PER of 20 dB or higher, then the insertion loss caused by the polarizer 205 will be modest, i.e. only 1% for a 20 dB PER input beam. Although FIG. 2B is of the depolarizer 200, and the polarizer 205 is illustrated as being integrated with the depolarizer, it will be understood that it would also be possible to achieve the same function by instead integrating the polarizer 205 with the module of the light source 100, i.e. at its output. Adding the polarizer 205 can be expected to improve, i.e. increase, the PER of the two light signal portions propagating along the arms 212, 214 and hence decrease the DOP at the depolarizer's output.

Figure 4:
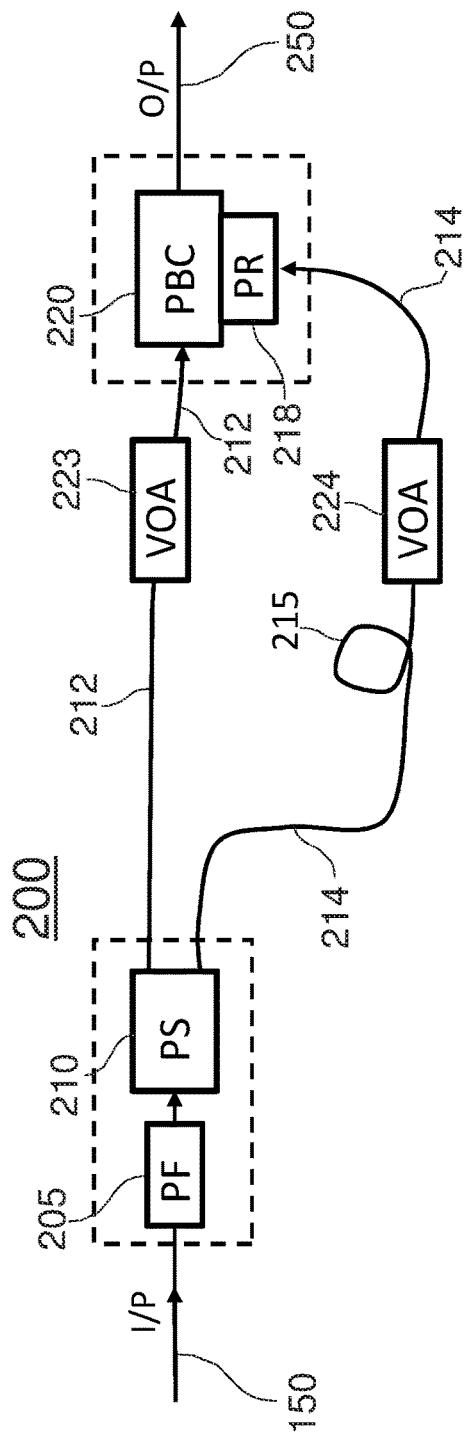
FIG. 4 shows a further design variant incorporating variable optical attenuators in both arms of the depolarizer.

FIGS. 3 and 4 show further related design variants in which optical attenuators are arranged in the arms 212, 214. In FIG. 3, a fixed optical attenuator (FOA) is arranged in one arm and a variable optical attenuator (VOA) in the other. In FIG. 4, both arms have a VOA. For embodiments with a FOA and a VOA in respective arms, it is noted that these may be in either arm, e.g. the VOA may be in the arm with or without the delay line. Moreover, the delay line may be arranged upstream or downstream of the optical attenuator. Still further, for embodiments with an FOA, the FOA need not be a separate optical component, but may simply be a loss induced by some means in the relevant arm, e.g. through bending losses in an optical fiber, or coupling losses at one of the interfaces, e.g. at the PS 210 or PBC 220, or through using a more lossy optical fiber or solid-state waveguide material for that arm. In addition, the VOA also need not be a separate optical component, but may simply be a variable loss that can be induced by some means, such as variable bending loss in an optical fiber induced by actively varying how the fiber is bent with a suitable optomechanical component, or by locally varying fiber temperature in a bend in the fiber with local heating, or actively varying coupling losses at one of the interfaces, e.g. at the PS 210 or PBC 220.

A VOA provided as part of the depolarizer may use an electrical input signal to change its attenuation, for example an electrical current or an electrical voltage. Current-driven VOAs are available which are based on a Mach-Zehnder interferometer (MZI) with a heater in one arm to exploit the change of refractive index of a waveguide with temperature. However, inducing heat in an optical package that is otherwise temperature-stabilized, for example for high wavelength accuracy, may not be desirable for some applications in which case voltage-driven VOAs may be preferable, since they induce little or no current, so that much smaller amounts of power dissipation are generated inside the optical package. Voltage-driven VOAs are available which are based on changing the refractive index of a waveguide through an electrical field induced by the applied voltage across the waveguide, for example based on the Kerr effect. Such a voltage-driven VOA is realizable in LiNbO3, for example, with an MZI featuring zero OPD. There exist a wide variety of VOAs that could be used for realizing a depolarizer in the context of this invention. For example, it can be also envisioned to realize VOAs based on liquid crystals (http://www.iprns.fraunhofer.de/en/research-development/smart-microoptics/waveguides.html), which could be also implemented together with waveguides, an optical delay stage, a PS or even a PBC. It might be also envisioned to use micro-electro-mechanical systems (MEMS) for realizing VOAs where an optical deflector, mirror, shutter, or similar device is used in the optical beam path of the relevant depolarizer arm. Whichever design choice is made for implementing FOAs and VOAs, it should be borne in mind that it is important for performance of the depolarizer with a broadband source that the FOAs/VOAs have a flat spectral response.

In some embodiments, the VOAs will be adjusted as part of the assembly and testing, and the product will be shipped to the customer with this pre-adjustment. That is to say, the VOA is adjusted to tune the performance at the point of manufacture, and possibly occasionally thereafter as part of maintenance. In other embodiments, the VOAs will be under control of a controller which may be configured to permit active control during operation through a feedback loop, or permit regular tuning by the end user, e.g. before each operation.

FIG. 3 illustrates an FOA 222 arranged in the first arm 212 and a VOA 224 arranged in the second arm 214. Otherwise the depolarizer design is the same as in FIG. 2B. The FOA 222 is chosen to provide a small fixed attenuation (e.g., 1 dB) in order to achieve optimum power balancing at the output of the beam combiner. The magnitude of the fixed attenuation depends on the excess loss, i.e. minimum residual loss, of the VOA 224. The VOA 224 is chosen to provide a small adjustment range (e.g., 0 dB to –3 dB) so as to be able to provide power balancing, i.e. equalization, at the output of the beam combiner. Even though it is true that, for power balancing, only a small adjustment range of the VOA would be needed, it is nevertheless beneficial to provide a larger adjustment range for other reasons. In particular, as mentioned elsewhere in the description of FIG. 11, it is useful during setup and calibration to fully block the light on all but one arm in order to measure the output power at the output of the depolarizer when only the unblocked arm is active. In the present, two-arm embodiment, that would mean fully blocking the light in the arm with the VOA 224 and measuring the power output that comes only from the other arm.

FIG. 4 illustrates one VOA 223 arranged in the first arm 212 and another VOA 224 arranged in the second arm 214. Otherwise the depolarizer design is the same as in FIG. 2B. Each VOA 223, 224 is chosen to provide a small adjustment range (e.g., 0-3 dB) so as to be able to provide power balancing, i.e. equalization, at the output of the beam combiner.

Figure 5:
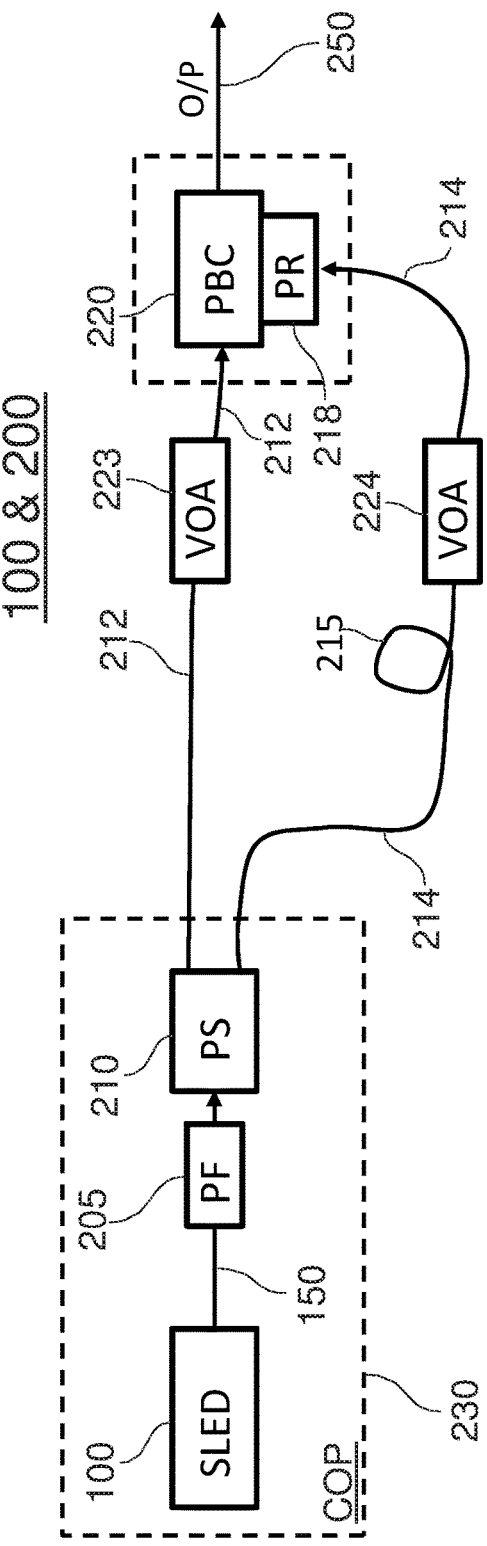
FIG. 5 shows an embodiment combining a source and a depolarizer, wherein the optical design of the depolarizer is the same as in FIG. 4, and in which the source and some input-side optical components of the depolarizer are arranged in a common optical package.

FIG. 5 shows a variant of FIG. 4 in which the SLED 100, optional PF 205 and PS 210 are arranged in an integrated module in the form of a COP 230. The initial interface between the COP 230 and the arms 212, 214 is part of the COP, and then the arm portions that are in the COP are 'pigtailed', i.e. connected, e.g. through fiber 'snouts', i.e. butted fiber, to the main arm portions as illustrated schematically, which may for example be PM fiber.

FIG. 6A shows another variant of FIG. 4, which compared with the FIG. 5 variant brings the VOAs 223, 224 (but not the delay line 215) into the COP 230. Moreover, a PIC 240 is provided in which the PS 210, VOA 223, VOA 224 and associated portions of the arms 212 and 214 are integrated on a single chip. The optical coupling of the SLED output into the PIC 230 may be realized using free-space micro-optics with for example one or two (micro)lenses. The PF 205 may be omitted, for example if the waveguide of the PIC 240 which leads to the input of the PS 210 only supports one polarization state, so effectively acts as a linear polarizer, or if the output of the SLED 100 is already sufficiently highly linearly polarized.

The outputs from the PIC 240 to the inside of the COP 230 can be formed with free-space micro-optics, e.g. one or two lenses for each connection, lensed fibers, butt coupling, e.g. with epoxy resin, or etched V-grooves in the PIC to provide alignment.

The outputs from the COP 230 to the external portions of the arms 212, 214 may be realized in the same way as described with reference to FIG. 5. It will be understood that various fiber portions for the arms, if used, may be PM fiber.

FIG. 6B shows a variant of FIG. 6A in which the optical delay line 215 is also integrated into the PIC 240. The delay line 215 is illustrated as being arranged downstream of the VOA 224. The light from the SLED could be directly coupled into the PIC using a grating coupler, or a butted fiber in a so-called pigtail, or with free-space micro-optics. For some materials systems, the SLED light source 100 and PIC 240 could be integrated monolithically on the same chip, e.g. on an InP chip using the GaAlInAsP materials system. Light coupling from the SLED 100 to the PIC 240 could also be realized using butt coupling or flip-chip mounting of the SLED's chip onto the chip of the PIC 240. Flip-chip mounting is potentially attractive when the SLED source 100 and PIC 240 are realized in different materials systems and would allow direct coupling of the SLED output to the input waveguides of the PIC without micro-optics. Here it is assumed that the PF 215 is integrated on-chip with either the SLED 100 or PIC 240. In other embodiments, the PF may be omitted.

FIG. 6C shows a variant of FIG. 6B in which with PR 218 and PBC 220 are accommodated in the COP 230, so the COP 230 houses a complete optical subsystem of optical source and depolarizer. All optical components may then be conveniently subject to common temperature control, e.g. by providing the COP 230 with a Peltier device, or without temperature control at least common temperature fluctuations. The coupling between the arm outputs of the PIC 240 and the inputs of the PR 218 and PBC 220 respectively may then be realized either in optical fiber or free-space optics, e.g. with collimating lenses, as desired. The coupling between the output of the PBC 220 and the output of the COP 230 may also be realized either in optical fiber or free-space optics, e.g. with collimating lenses, as desired. For example, in fiber, the COP 230 will have a single fiber snout made of appropriate fiber, e.g. SM fiber.

FIG. 7 shows a variant of FIG. 6C in which the PIC 240 of FIG. 6C is dispensed with, but the same optical components are still accommodated in the COP 230. In this variant, the whole of each arm 212, 214 may be implemented with respective optical fiber or free-space micro-optics. If free-space micro-optics are used, then the delay line 215 could be implemented with a retarder for example.

FIG. 8 shows a variant of FIG. 7 in which the delay line 215 is arranged external to the COP 230, so that a pair of delay line connectors 216, 217 are added to the 'pins' of the COP 230 to interface with the external fiber loop 215 used to form the delay line, which may be realized in PM fiber. The COP 230 will then have one SM fiber snout 219 for the depolarizer output and two PM fiber snouts for the external fiber delay line.

FIG. 9 shows a variant of FIG. 6C in which the PR 218 and PBC 220 are also integrated in the PIC 240.

FIG. 10 shows a variant of FIG. 9 in which an additional optical component is provided, namely a photodiode (PD) 226 arranged to collect a portion of the light output from the beam combiner 220. A splitter 228 taps off a small portion (e.g. 1-5% of the power) of the depolarized output for the photodiode 226. The role of the photodiode 226 is to monitor the power fluctuations of the depolarized output from the beam combiner and supply the sensed signal to a controller which then controls the VOAs 223, 224 (or other active components). Namely, when the output power of the depolarizer after the combiner is such that exactly 50% comes from one arm and exactly 50% comes from the other arm, then the PER is unity (i.e. DOP is zero), since perpendicular polarizations are received by the beam combiner. On the other hand, if the light signal portions received from the two arms at the beam combiner do not have perpendicular polarization (i.e. not exactly 90° offset but say ~85° offset) then the beam combiner output will have reduced power and the power balancing of the light of the two arms may not be optimal.

In the embodiment of FIG. 10, the photodiode 226 and splitter 228 are integrated in the PIC 240, but it will be appreciated in other embodiments with or without PIC, specifically those described above, these optical components could be configured as individual components with appropriate, fiber or free-space interconnection.

FIG. 11 shows a variant of FIG. 10 in which additionally a further two photodiodes 226 are provided to measure power variations in the two arms 212, 214 respectively via two associated splitters 228 which tap off a small portion of the light travelling down the two arms. The additional power monitoring photodiodes on each arm are used to control each VOA in an active feedback loop, for example to guarantee stable performance over a wide temperature range. These additional photodiode sensors are useful in cases where, for example, there is instability in temperature across the different optical components either individually or collectively for the whole module contained in the COP 230, or time-variation in the power splitting function of the PS 210 or in some spectral or polarization characteristic of the SLED output. In such cases, providing a single photodiode (power monitor) at the output may not be sufficient to meet a particular specified DOP for the depolarizer output. With the embodiment of FIG. 11, the depolarizer can be adjusted as follows:

Maximize the attenuation in one of the arms using its VOA, ideally to result in zero output power from this arm;

Measure the optical power after the beam combiner, which is now only receiving a signal from the arm whose signal has not been attenuated, to obtain a calibration value; and Adjust the VOA in the attenuated arm until the optical power after the beam combiner is twice the calibration value measured in b), corresponding to an optimum power balancing of 50:50 for both arms and hence in optimal depolarization.

In the arrangement of FIG. 11 with a photodiode in each arm, in addition to the one at the output of the depolarizer, it is possible to monitor the power ratio between the arms (two arms in this embodiment) over time. It is then possible to calculate the instantaneous DOP at any time during operation, so variations in the DOP performance can be monitored with reference to the power ratios measured during calibration. Under control of a suitable controller acting on the adjustable components, i.e. the VOA(s) and/or polarization rotator(s), the depolarizer can then be adjusted during operation to maintain DOP within a specified limit or to maximize depolarizing performance. The combination of having a photodiode in each arm and at the output of the depolarizer also makes it possible to distinguish between power fluctuations of the input channel (light source) and DOP changes. It will be understood in this discussion that reference to photodiodes could be generalized to any light power sensors.

Although photodiodes are described as the power sensors, it will be appreciated that a wide variety of power sensors are available which could be used instead. Moreover, although the photodiodes are described as receiving a portion of the light via a splitter, there are many other alternatives for a power sensor to access the light propagating down the arms or at the depolarizer output. For example, in a PIC, grating couplers may be used to couple out light vertically from the PIC to the monitoring PDs.

In further embodiments, a PIC with the depolarizer 200 and optionally also the light source 100 may also accommodate the downstream optical component 300. In still further embodiments, a COP with the depolarizer 200 and optionally also the light source 100 may also accommodate the downstream optical component 300. As well as the downstream optical component 300, e.g. a FBG sensor, the PIC or COP could accommodate a receiver part that is provided to detect light reflected from the FBG sensor. A circulator could be arranged to physically separate the forward-traveling light from the depolarized source from the backward-traveling light from the FBG sensor. The receiver could be a spectral-domain FBG receiver with an optical filter structure (e.g., AWG) or a time-domain FBG receivers based on time-of-flight (TOF), reflections from each FBG sensor being associated with different times of flight (TOF).

Figure 12:
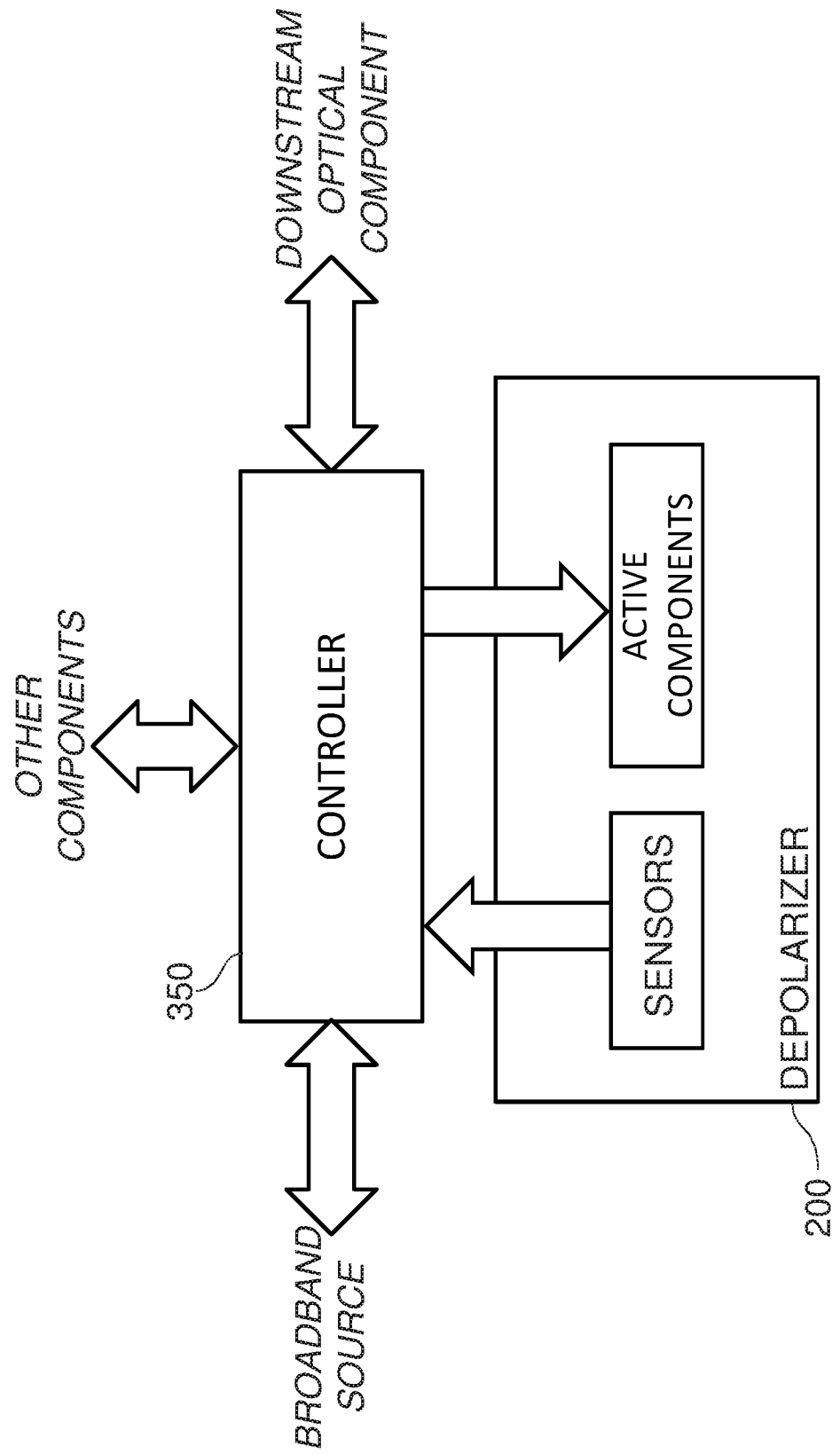
FIG. 12 is a schematic diagram of an example electronic control architecture which may be used with the embodiments of FIG. 10 or 11.

FIG. 12 is a schematic diagram of an example electronic control architecture which may be used in particular with the embodiments of FIG. 10 or 11, but would also be suitable for any other embodiments. A controller 350 is connected to receive sensor signals from the power sensors 226 which are then fed into a control program realized with suitable hardware, firmware or software, to decide how to control one or more active optical components in the depolarizer 200, such as the VOAs. Computer program code for carrying out the control may be written in any combination of one or more programming languages, including an object-oriented programming language such as Java™, Smalltalk, C++, C #, Objective-C, LabVIEW, or the like, and conventional procedural programming languages. The controller 350 has the function of controlling a control loop that is operable to stabilize the DOP at the output of the depolarizer over a specified range of operating conditions (e.g., wide ambient temperature range, for example −40° C. to +85° C.) and/or over time (for example over 10,000 to 100,000 hours of continuous operation). The control elements can be implemented through a suitable combination of analogue or digital hardware, firmware and/or software with one or more microprocessors or microcontrollers. The controller 350 may also receive inputs from the SLED or other source, and/or the downstream optical component, and/or other optical components in the system, and feed these inputs into the control program. Moreover, the controller 350 may actively control components in the source or downstream optical component according to the control program, as illustrated. A further role of the controller 350 may be to maintain temperature stabilization of the COP or individual elements housed in the COP such as the SLED or PIC based on temperature sensor readings which it receives. Alternatively, there may be a separate temperature controller, or no temperature stabilization components. Moreover, the controller 350 may be separate from or the same as the SLED controller. The controller 350 may also be connected to other external electronics components and subassemblies, such as suitable driver electronics for operating the, for example, current-driven or voltage-driven VOAs. Parts of or all of the controller may be co-housed in a COP with the optical components.

Although active control adds a layer of complexity, it has the potential advantage of allowing higher-volume and lower-cost fabrication, since much of the adjustment of components which would otherwise form part of assembly and testing of the optics at the manufacturer prior to shipping to a customer can be avoided. Active control should also help provide for stable performance over a wide range of temperature and over long periods of time, for example by implementing active control loops or by using a look-up table stored in the controller.

Figure 13:
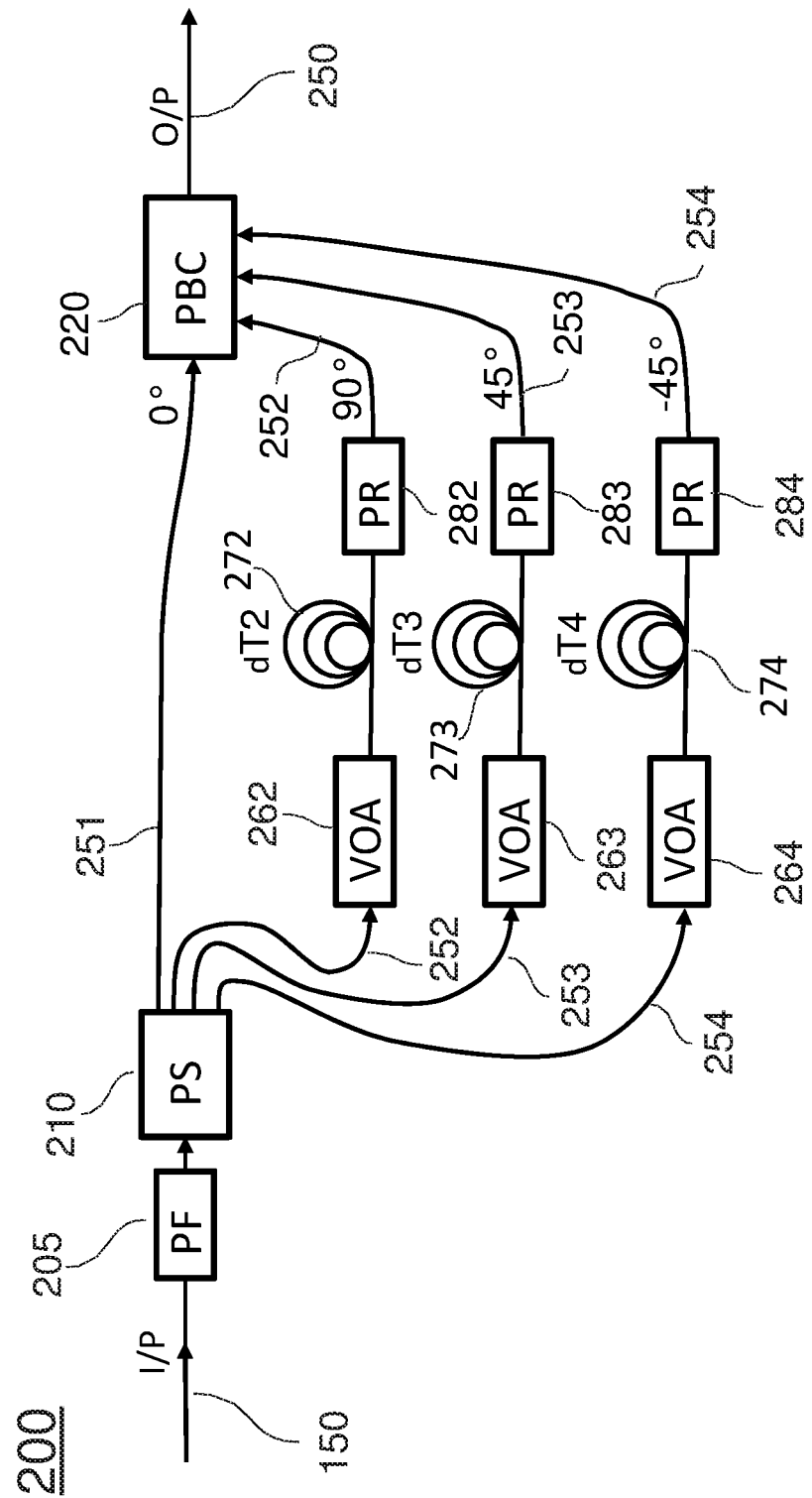
FIG. 13 shows an alternative embodiment of a depolarizer with four arms, three of which have a variable optical attenuator in which the input light is split into the four arms and then recombined at the output.

FIG. 13 shows an alternative embodiment of a depolarizer 200 with four arms 251, 252, 253, 254, instead of two as in the previous embodiments. (Other embodiments with three arms or in principle any plural number of arms could also be contemplated.)

The depolarizer 200 receives light from the light source (not shown) via an input 150 at an input which leads via an optional polarization filter 205 to a power splitter (PS) 210. The power splitter 210 is configured to split the optical signal into four optical signal portions of at least approximately equal power and substantially the same, preferably linear, polarization state and substantially the same spectrum (i.e. power distribution as a function of wavelength over the typically broadband emission of the light source). The power splitter 210 may, for example, be three 50:50 splitters with two arranged in a cascade downstream of the first one to supply one quarter of the into power into each of the arms. (The input signal is thus not split on the basis of polarization, but power, with the four signal portions having the same polarization.) The PER of each signal portion is ideally significantly more than that of the input, for example 5-15 dB higher than the input PER. For example, if the input signal PER is 20 dB, then the PER of the signal portions after the power splitter may be 30 dB. This can be achieved by employing a power splitter that only acts on one polarization state, i.e. the dominant one output from the SLED.

The four optical signal portions from the power splitter 210 are received into the four arms 251, 252, 253, 254 which are light paths for the respective signal portions. The light paths may be free space light paths or waveguides, wherein the waveguides may be optical fiber or solid state. The four arms are preferably physically separate such that the four signal portions are optically decorrelated from each other, thus avoiding polarization mixing and cross-coupling between the arms. The four arms 251, 252, 253, 254 have respective VOAs 262, 263, 264, delay lines 272, 273, 274 and polarization rotators 282, 283, 284 arranged in line. The arms have different optical path lengths from each other by including optical delay lines 272, 273, 274 (dT2, dT3, dT4) in the second, third and fourth arms respectively. The rotators are configured so that each of two pairs of the arms have their signals rotated by 90 degrees relative to each other. That is, the polarization rotator 282 in the second arm 252 is shown rotating at 90 degrees (relative to the first arm), and the polarization rotators 283 and 284 of the third and fourth arms 253, 254 also rotate to achieve a 90 degree difference by rotating at +45 and −45 degrees respectively. The first arm 251 is illustrated as not including any variable optical attenuators or delay lines, but the first arm could include additional components of this kind, but that is not necessary. However, a fixed optical attenuator or variable optical attenuator could be added to the first arm if desired. The arms 251, 252, 253, 254 reconverge at a polarization beam combiner (PBC) 220, which combines the at least roughly equal power components from the four arms and then routes the recombined signal to an output 250. In the embodiment of FIG. 13, other implementation details and possible variations are as discussed above in relation to the previous embodiments, in particular with reference to FIGS. 1 to 4. For example, the omission of a VOA and/or polarization rotator in the first arm as illustrated in FIG. 13 is optional, so one variation would be to include a VOA and/or a polarization rotator also in the first arm. The order of arrangement of the VOA, polarization rotator and delay line in each arm could also be varied.

Figure 14:
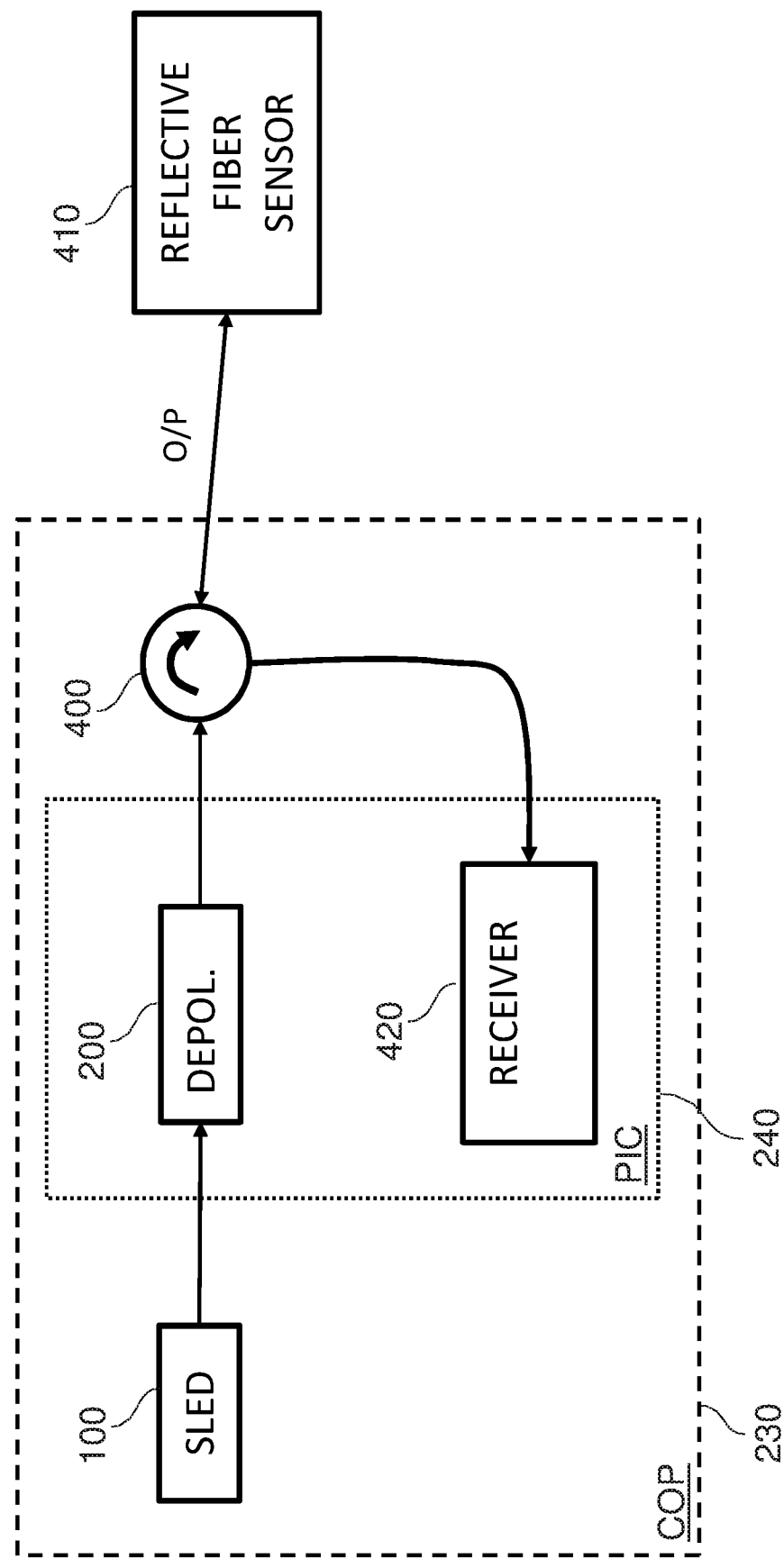
FIG. 14 is a schematic drawing of a light source, depolarizer and downstream optical components as generically shown in FIG. 1, wherein the downstream optical components are a reflective optical fiber sensor, receiver filter and optical circulator.

FIG. 14 is a schematic drawing of a source, depolarizer and example downstream optical components. This is an example of what is shown generically in FIG. 1 for the downstream optical components. Namely, the downstream optical components form a sensor arrangement comprising a reflective optical fiber sensor 410 and receiver 420. The light output from the depolarizer passes through an optical circulator 400 to the fiber sensor 410 which then reflects at least a component of the received signal, which is then routed to the receiver 420 by the optical circulator 400. The reflective optical fiber sensor 410 could for example be a fiber Bragg sensor (FBG), Brillouin sensor or Raman sensor. The receiver 420 may be an arrayed waveguide grating (AWG) with an associated photodiode array. As in the previous embodiments, various components may be integrated into a PIC 240 and/or a COP 230. For example, as illustrated the source 100, depolarizer 200, circulator 400 and receiver 420 could be in a COP 230 and within the COP 230 the depolarizer 200 and receiver 420 could be in a single PIC. If desired, the circulator could also be accommodated in the PIC. Another variation would be to replace the circulator with a fused fiber coupler or free-space coupler, which might be an option if the additional losses and back-injection of the reflected signal into the depolarizer could be tolerated.

Figure 15:
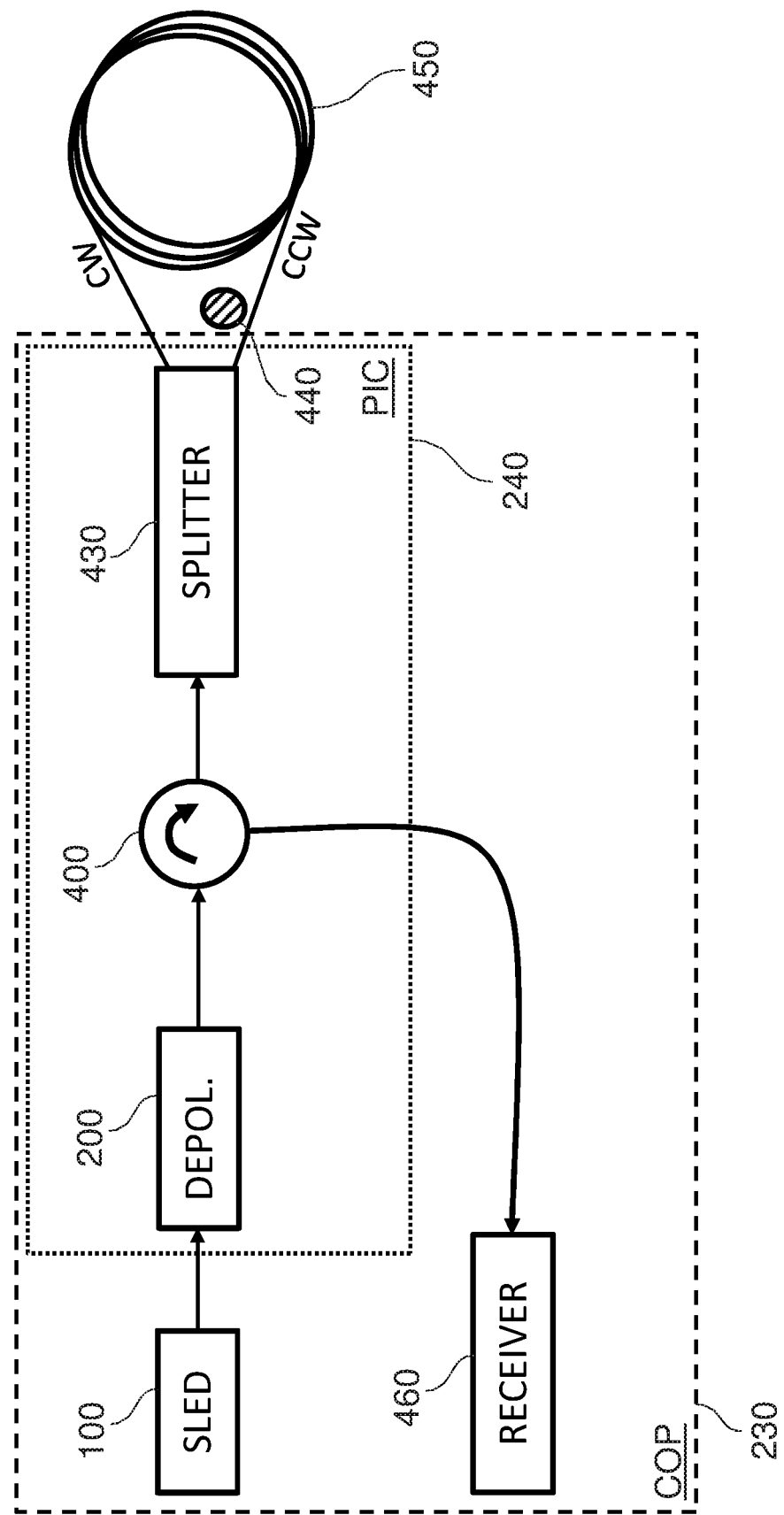
FIG. 15 is a schematic drawing of a light source, depolarizer and downstream optical components as generically shown in FIG. 1, wherein the downstream optical components form a fiber optical gyroscope (FOG) with the components of a splitter, phase modulator, fiber loop, receiver and optical circulator.

FIG. 15 is a schematic drawing of a source, depolarizer and example downstream optical components. This is another example of what is shown generically in FIG. 1 for the downstream optical components. Namely, the downstream optical components form a fiber optical gyroscope (FOG). The active sensor part of the device is a fiber loop 450. In the case of a FOG, the fiber loop 450 receives counter-rotating optical signals labelled CW for clockwise and ACW for anti-clockwise (i.e. counter-clockwise), whose path difference under motion of the gyroscope is measured. The optical system comprises a light source 100, depolarizer 200, and, as the downstream components, an optical circulator 400, a splitter 430 and the already-mentioned optical fiber loop 450, as well as a receiver 460. As in the previous embodiments, various components may be integrated into a PIC 240 and/or a COP 230. For example, as illustrated the depolarizer 200, circulator 400 and splitter 430 could be in a PIC 240 which is housed in a COP 230 also including the source 100 and receiver 460. The source 100 and/or receiver 460 could also be included in the PIC. Another variation would be to replace the circulator with a fused fiber coupler or free-space coupler, which might be an option if the additional losses and back-injection of the light returning from the fiber loop 450 into the depolarizer could be tolerated.

Another example device would be a fiber optic current sensor (FOCS) which could have the same structure as the FOG shown in FIG. 15. In a FOCS application, the fiber loop 450 would be wrapped around an electrical current carrier, i.e. a wire, 440 and the current is measured through the Faraday effect whereby the electromagnetic field causes polarization rotation of the light passing through the fiber loop 450. As known to the skilled person other FOCS structures are known, for example those based on a single-ended fiber with terminating mirror, instead of a loop, and these also could be implemented with the depolarizer as disclosed herein.

Figure 16:
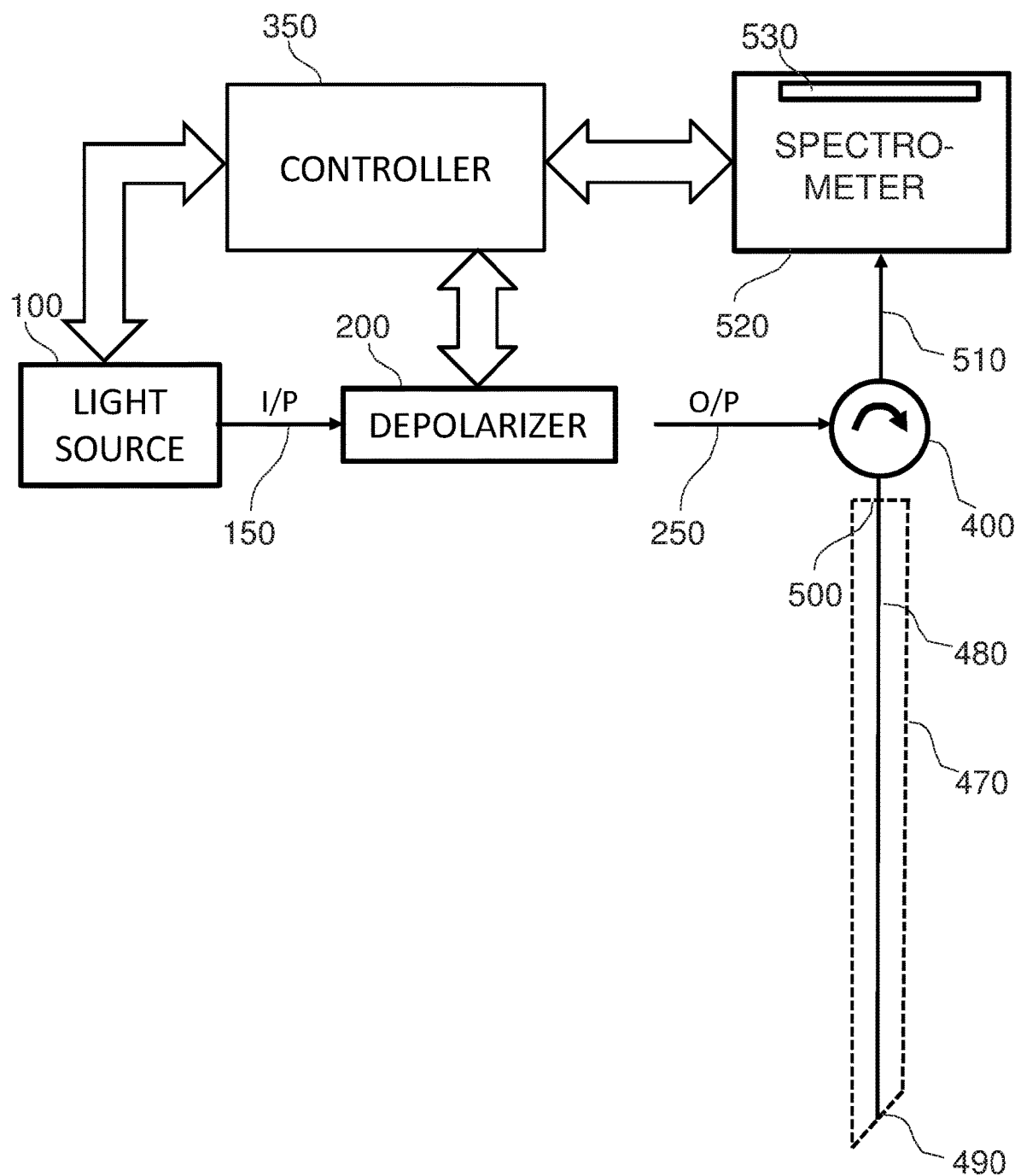
FIG. 16 is a schematic drawing of a medical device system comprising a light source, depolarizer and downstream optical components as generically shown in FIG. 1, wherein the downstream optical components form an endoscopic, laparoscopic, bronchoscopic or catheter-like medical device.

FIG. 16 is a schematic drawing of a medical device system comprising a light source, depolarizer and downstream optical components as generically shown in FIG. 1, wherein the downstream optical components form an endoscopic, laparoscopic, bronchoscopic or catheter-like medical device. The optical system comprises a light source 100, depolarizer 200, and, as the downstream components, an optical circulator 400. An optical path 150 connects the source 100 and depolarizer 200 and a further optical path 250 connects the depolarizer 200 and circulator 400. The downstream optical components forming the medical device comprise an insertion tube 470, which may be rigid or flexible, suitable for insertion into a patient, for example into a bodily orifice, such as a blood vessel, digestive tract, lung, colon, esophagus etc. The insertion tube 470 includes a light guide 480 which may be formed entirely or in part from an optical fiber or optical fiber bundle, or may be a hollow light guiding tube or some other light guide, and may include free-space optical elements such as lenses, e.g. for collimating, coupling in, coupling out and focusing. The light guide terminates at or near a distal tip 490 of the insertion tube. Light from the light source 100 is supplied to the distal tip 490 via the depolarizer 200 and circulator 400 and any necessary coupling optics (not shown) between the circulator and proximal end 500 of the insertion tube. Light collected from the sample area adjacent the distal tip 490 of the insertion tube 470, e.g. by scattering or fluorescence, may be guided back to the detection optics also by the same light guide 480 that conveyed the excitation light, or via a different light guide (not shown) arranged in the insertion tube 470. The collected light passes through the circulator 400 via a light path 510 to a spectrometer 520 and light detector 530. If no spectral filtering of the collected light signal is needed, then a spectrometer will of course not be present prior to the light detector. Moreover, excitation spectroscopy may be carried out with a wavelength-tunable light source. The light detector 530 may be an array detector such as a charged coupled device (CCD) or photodiode array, or a light detector without spatial resolution, e.g. a single photodiode. The system is under the control of a controller 350 via control lines schematically illustrated with double-headed arrows which may additionally have data processing functionality, e.g. for image processing or other data analysis of signals received at the detector 530. Alternatively, measurement data may be passed, e.g. by the controller, to a separate computing apparatus for image processing and/or data analysis. As in the previous embodiments, various components may be integrated into a PIC 240 and/or a COP 230. Another variation would be to replace the circulator with a fused fiber coupler or free-space coupler.

It will be understood by a person skilled in the art that features of the different embodiments can be combined and exchanged to create further embodiments, and that when particular kinds of component are recited for each of the optical source 100, and optical component 300, that particular component could be exchanged for another particular component. Moreover, use of free-space optics, optical fibers and solid-state waveguides incorporated in PICs are in general freely combinable and swappable for various sections of each of the optical paths.

REFERENCE NUMERALS 100 (broadband) light source, e.g. SLED
150 optical path between source and depolarizer—input to depolarizer
200 depolarizer
205 polarizer, i.e. polarization filter
210 power splitter
212 first arm of depolarizer
214 second arm of depolarizer
215 delay line (dT)
216 COP fiber delay line connector (upstream), e.g. PM fiber
217 COP fiber delay line connector (downstream), e.g. PM fiber
218 polarization rotator
219 COP fiber output connector, e.g. SM fiber
220 (polarization) beam combiner
222 fixed optical attenuator (FOA) in first arm
223 variable optical attenuator (VOA) in first arm
224 variable optical attenuator (VOA) in second arm
226 photodiode (PD)
230 common optical package (COP)
240 photonic integrated circuit (PIC)
250 optical path between depolarizer and optical component—output from depolarizer
251 first arm of depolarizer
252 second arm of depolarizer
253 third arm of depolarizer
254 fourth arm of depolarizer
262 variable optical attenuator (VOA) in second arm
263 variable optical attenuator (VOA) in third arm
264 variable optical attenuator (VOA) in fourth arm
272 delay line in second arm (dT2)
273 delay line in third arm (dT3)
274 delay line in fourth arm (dT4)
282 polarization rotator in second arm
283 polarization rotator in third arm
284 polarization rotator in fourth arm
300 optical component downstream of depolarizer
350 controller
400 optical circulator
410 reflective fiber sensor
420 receiver
430 splitter
440 wire
450 optical fiber loop
460 receiver
470 insertion tube
480 light guide
490 distal tip
500 proximal tip
510 collection light path
520 spectrometer
530 light detector

What is claimed is:

1. An optical system comprising:
a light source operable to output an optical signal; and
a depolarizer device arranged to receive at its input the optical signal output from the light source,
the depolarizer device comprising:
an input for receiving an optical signal from an optical source;
a power splitter configured to split the optical signal into at least first and second optical signal portions of substantially the same polarization state;
at least first and second arms which are light paths connected respectively to receive the at least first and second optical signal portions from the power splitter;
an optical delay line arranged in one of the first arm and the second arm to introduce an optical path difference between the first and second arms that is at least 50 times greater than the coherence length of the light source;
a polarization rotator arranged in the first arm and operable to rotate the polarization state of the first optical signal portion to be orthogonal to that of the second optical signal portion;

a beam combiner arranged to receive and recombine at least the first optical signal portion after rotation by the polarization rotator and the second optical signal portion to form an output optical signal;

a variable optical attenuator, VOA, arranged in one of the first arm and the second arm and having a control input through which it can be adjusted during operation of the depolarizer device over an adjustment range which at maximum attenuation results in zero output power;

first and second power sensors configured and arranged to measure respective optical powers of the first optical signal portion and the second optical signal portion and to generate respective first and second sensor signals therefrom;

a third power sensor configured and arranged after the beam combiner to measure optical power of the recombined optical signal, and to generate a third sensor signal therefrom;

a controller arranged to receive the first, second and third sensor signals and configured to determine a control signal based on the sensor signals and to apply the control signal to the control input of the VOA so as to equalize power of the first and second optical signal portions; and an output operable to output the output optical signal.

2. The optical system of claim 1, wherein the optical path difference introduced by the optical delay line is at least one of: 100, 200, 300, 400, 500, 600, 700, 800, 900, 1000, 1500 or 2000 times greater than the coherence length of the light source.

3. The optical system of claim 1, wherein the light source is configured so that the output optical signal is linearly polarized with a polarization extinction ratio of at least one of: 5, 10, 15, 20 and 25 dB.

4. The optical system of claim 1, wherein the light source has a broadband output optical signal in which the ratio of bandwidth, as defined by full width half maximum, to center wavelength $\Delta\lambda/\lambda$ is greater than one of: 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 30, 40, 50 and $100\times10^{-3}$.

5. The system of claim 1, wherein the light source is one of a:
a superluminescent diode;
a module of multiple superluminescent diodes;
a rare-earth doped amplified spontaneous emission, ASE, optical fiber source;
a light emitting diode;
a supercontinuum source;
a single-frequency external cavity laser;
a single-frequency distributed feedback, DFB, laser;
a sample grating, SG, DBR laser;
a vertical cavity surface emitting lasers, VCSEL;
a multi-frequency external cavity laser; and
a wavelength-tunable ASE source.

6. The system of any of claim 1, wherein at least two of the light source, the depolarizer and the downstream optical component are arranged in a common photonic integrated circuit.

7. The system of any of claim 1, wherein at least two of the light source, the depolarizer and the downstream optical component are arranged in a common optical package.

8. The system of claim 1, wherein the controller has a setup and calibration mode configured to:
maximize the attenuation in one of the arms using the VOA to result in zero output power from the arm of the VOA;
measure the optical power after the beam combiner with the third power sensor to obtain a calibration value; and
adjust the VOA until the optical power after the beam combiner as measured by the third power sensor is twice the calibration value, corresponding to an equal power balancing between the first and second arms.

9. The system of claim 8, wherein the controller has an operational mode configured to:
monitor the power ratio over time between the first and second arms as measured by the first and second power sensors;
calculate the instantaneous degree of polarization from the power ratio; and
adjust the VOA and/or the polarization rotator to maintain the degree of polarization within a specified limit or to maximize the degree of polarization.

10. The system of claim 1, wherein the controller has an operational mode configured to:
monitor the power ratio over time between the first and second arms as measured by the first and second power sensors;
calculate the instantaneous degree of polarization from the power ratio; and
adjust the VOA and/or the polarization rotator to maintain the degree of polarization within a specified limit or to maximize the degree of polarization.

11. The system of claim 1, further comprising a polarization filter arranged between the input and the power splitter, so that the optical signal is filtered into a linear polarization state prior to being received by the power splitter.

12. The system of claim 1, wherein the first and second arms are configured to have approximately equal attenuation across a specified wavelength range.

13. The system of claim 1, wherein the first and second arms are configured to be substantially transparent across a specified wavelength range.

14. The system of claim 1, wherein the first and second arms provide spatially separated light paths for the first and second optical signal portions.

15. The system of claim 1, wherein the first and second arms include at least sections of planar waveguides and/or optical fibers.

16. The system of claim 15, wherein the planar waveguides or optical fibers of the first and second arms are polarization maintaining.

17. The system of claim 1, wherein the optical attenuator is one of a voltage-driven and a current-driven variable optical attenuator.

18. The system of claim 1, comprising a further variable optical attenuator arranged in the other of the first arm and the second arm and having a control input through which it can be adjusted during operation of the device by the controller.

19. The system of claim 1,
wherein the power splitter is configured to split the optical signal into at least third and fourth optical signal portions in addition to the first and the second optical signal portions, wherein the first to fourth optical signal portions are of substantially the same polarization state;
further comprising at least third and fourth arms, in addition to the first and second arms, the third and fourth arms being light paths connected respectively to receive the at least third and fourth optical signal portions from the power splitter;

further comprising respective additional optical delay lines arranged in the third and fourth arms, wherein the optical delay lines have different optical path lengths from each other;

further comprising at least second and third polarization rotators in the second and third arms and operable to rotate the polarization state of the first and second optical signal portions to be orthogonal to those of the second and fourth optical signal portions respectively;

wherein the beam combiner is additionally arranged to receive and recombine at least the third and fourth optical signal portions to form an output optical signal.

20. An optical system comprising:
a light source operable to output an optical signal;
a depolarizer device arranged to receive at its input the optical signal output from the light source; and
a downstream optical component of a particular bandwidth and associated coherence length, which is arranged to receive the optical signal output from the depolarizer device,
the depolarizer device comprising:
an input for receiving an optical signal from an optical source;
a power splitter configured to split the optical signal into at least first and
second optical signal portions of substantially the same polarization state;
at least first and second arms which are light paths connected respectively to receive the at least first and second optical signal portions from the power splitter;
an optical delay line arranged in one of the first arm and the second arm to introduce an optical path difference between the first and second arms that is at least 1.5 times greater than the coherence length of the down stream optical component;
a polarization rotator arranged in the first arm and operable to rotate the polarization state of the first optical signal portion to be orthogonal to that of the second optical signal portion;
a beam combiner arranged to receive and recombine at least the first optical signal portion after rotation by the polarization rotator and the second optical signal portion to form an output optical signal;
a variable optical attenuator, VOA, arranged in one of the first arm and the second arm and having a control input through which it can be adjusted during operation of the device over an adjustment range which at maximum attenuation results in zero output power;
first and second power sensors configured and arranged to measure respective optical powers of the first optical signal portion and the second optical signal portion and to generate respective first and second sensor signals therefrom;
a third power sensor configured and arranged after the beam combiner to measure optical power of the recombined optical signal, and to generate a third sensor signal therefrom;
a controller arranged to receive the first, second and third sensor signals and configured to determine a control signal based on the sensor signals and to apply the control signal to the control input of the VOA so as to equalize power of the first and second optical signal portions; and
an output operable to output the output optical signal.

21. The optical system of claim 20, wherein the optical path difference introduced by the optical delay line is at least one of: 2, 3, 4, 5, 6, 7, 8, 9, 10, 20, 30, 40, 50, 60, 70, 80, 90 or 100 times greater than the coherence length of the downstream optical component.

22. The optical system of claim 20, wherein the light source has a broadband output optical signal and the downstream optical component has a narrowband response, the ratio of their coherence lengths being greater than one of: 5, 10, 15, 20, 30, 40, 50, 100, 200, 300, 400, 500, 600, 700, 800, 900, 1000, 1500 and 2000.

23. The system of claim 20, wherein the downstream optical component includes at least one of the following:
a fiber Bragg grating, FBG;
an arrayed waveguide grating, AWG;
a wavelength-division multiplexer, WDM, filter;
a phase modulator;
a coupler;
an optical fiber forming part of a catheter, laparoscope, endoscope or bronchoscope;
an optical fiber contained in a light-guiding tube;
a spectral add/drop filter;
an optical fiber loop sensor;
a Fabry-Pérot filter;
a dielectric edge filter;
bandpass filter; and
bandgap filter.

24. The system of any of claim 20, wherein at least two of the light source, the depolarizer and the downstream optical component are arranged in a common photonic integrated circuit.

25. The system of any of claim 20, wherein at least two of the light source, the depolarizer and the downstream optical component are arranged in a common optical package.

* * * * *